US012698673B2

(12) United States Patent
Chadwell

(10) Patent No.: US 12,698,673 B2
(45) Date of Patent: Aug. 4, 2026

(54) FLIGHT DECK BARRIER APPARATUS

(71) Applicant: Harper Engineering Company LLC, Renton, WA (US)

(72) Inventor: David Chadwell, Renton, WA (US)

(73) Assignee: HARPER ENGINEERING COMPANY LLC, Renton, WA (US)

( * ) Notice: Subject to any disclaimer, the term of this patent is extended or adjusted under 35 U.S.C. 154(b) by 400 days.

(21) Appl. No.: 17/887,302

(22) Filed: Aug. 12, 2022

(65) Prior Publication Data

US 2023/0047018 A1 Feb. 16, 2023

Related U.S. Application Data

(60) Provisional application No. 63/233,677, filed on Aug. 16, 2021.

(51) Int. Cl.
E06B 9/06 (2006.01)
E06B 3/48 (2006.01)
(Continued)

(52) U.S. Cl.
CPC ............ E06B 3/481 (2013.01); E06B 9/0669 (2013.01); *B64D 45/0026* (2019.08); *E05B 37/163* (2013.01)

(58) Field of Classification Search
CPC ............ E06B 9/262; E06B 2009/2625; E06B 2009/543; E06B 9/0661; E06B 9/063;
(Continued)

(56) References Cited

U.S. PATENT DOCUMENTS 1,479,312 A * 1/1924 O'Harrow ............. E06B 9/0669
49/56
3,012,837 A 12/1961 Morrissey, Jr.
(Continued)

FOREIGN PATENT DOCUMENTS

CN 206648396 U 11/2017
DE 102019117055 A1 12/2020
(Continued)

OTHER PUBLICATIONS

International Search Report and Written Opinion for International Application No. PCT/US2022/042738, date of mailing Dec. 19, 2022, 18 pages.
(Continued)

*Primary Examiner* — Abe Massad
(74) *Attorney, Agent, or Firm* — Seed Intellectual Property Law Group LLP

(57) ABSTRACT
The present disclosure is directed to a flight deck barrier apparatus or device including a frame having a first jamb, a second jamb, and a header. A foldable barrier mechanically coupled to the second jamb. An edge beam mechanically coupled to the foldable barrier. The edge beam configured to mechanically cooperate with strikers along the first jamb and mechanically cooperate with strikers along the second jamb. The edge beam including a plurality of catches. Respective ones of the plurality of catches interlock with corresponding ones of the strikers along the first jamb when the foldable barrier is in a stowed position such that a flight deck of an aircraft is accessible. Respective ones of the plurality of catches interlock with corresponding ones of the strikers along the second jamb when the foldable barrier is in an expanded position limiting access to the flight deck barrier of the aircraft.

17 Claims, 24 Drawing Sheets

(51) Int. Cl.
  *B64D 45/00* (2006.01)
  *E05B 37/16* (2006.01)
(58) Field of Classification Search
  CPC .......... E06B 9/0669; E06B 9/06; E06B 3/481;
                                        E05B 65/0085
  See application file for complete search history.

(56) References Cited

U.S. PATENT DOCUMENTS

| | | | | |
|---|---|---|---|---|
| 3,073,383 | A * | 1/1963 | Crick | .................. E05F 15/646 |
| | | | | 160/183 |
| 3,418,666 | A * | 12/1968 | Rockey | .................... A47K 3/30 |
| | | | | 160/231.1 |
| 3,441,076 | A * | 4/1969 | Glejf | ......................... E06B 3/94 |
| | | | | 160/196.1 |
| 4,357,981 | A | 11/1982 | Labelle | |
| 4,538,844 | A | 9/1985 | Watanabe | |
| 5,377,737 | A * | 1/1995 | Moriya | ................... E05F 1/025 |
| | | | | 160/84.06 |
| 5,456,303 | A | 10/1995 | Horinouchi | |
| 5,477,904 | A * | 12/1995 | Yang | ........................ E06B 9/262 |
| | | | | 160/84.06 |
| 6,152,206 | A * | 11/2000 | Chen | ...................... B60J 1/2091 |
| | | | | 160/370.23 |
| 6,253,826 | B1 * | 7/2001 | Witter | ..................... E06B 3/481 |
| | | | | 160/DIG. 16 |
| 6,345,476 | B1 * | 2/2002 | Hill | ........................... E06B 9/02 |
| | | | | 52/630 |
| 7,984,875 | B2 * | 7/2011 | Koehn | .............. B64D 45/0028 |
| | | | | 244/129.5 |
| 9,062,484 | B2 | 6/2015 | Miller | |
| 9,347,252 | B2 | 5/2016 | Klein | |
| 9,353,568 | B2 | 5/2016 | Knight et al. | |
| 9,428,259 | B2 | 8/2016 | Savian et al. | |
| 9,624,722 | B2 | 4/2017 | Hummel et al. | |
| 9,981,732 | B2 | 5/2018 | Goings et al. | |
| 10,030,421 | B2 * | 7/2018 | Guidos | ................... E05B 5/006 |
| 12,116,105 | B2 | 10/2024 | Homewood | |
| 2006/0000946 | A1 | 1/2006 | Garofani et al. | |
| 2006/0144528 | A1 | 7/2006 | Lee | |
| 2010/0078135 | A1 | 4/2010 | Alvarez et al. | |
| 2012/0031005 | A1 | 2/2012 | Liao | |
| 2012/0042573 | A1 * | 2/2012 | Knight | .................... E05D 15/12 |
| | | | | 49/449 |
| 2013/0146232 | A1 | 6/2013 | Swoboda et al. | |
| 2014/0366321 | A1 | 12/2014 | Chen | |
| 2015/0007502 | A1 | 1/2015 | Poppema | |
| 2016/0355264 | A1 | 12/2016 | Long et al. | |
| 2019/0128022 | A1 | 5/2019 | Markway | |
| 2020/0108907 | A1 * | 4/2020 | Movsesian | ......... B64D 45/0026 |
| 2021/0332627 | A1 | 10/2021 | Brunner et al. | |
| 2021/0363798 | A1 | 11/2021 | Subramanian et al. | |

FOREIGN PATENT DOCUMENTS

| | | | |
|---|---|---|---|
| EP | 0965719 | A2 | 12/1999 |
| GB | 532347 | A | 1/1941 |
| GB | 2381551 | A | 5/2003 |
| JP | 3662876 | B2 | 6/2005 |
| KR | 20180003773 | A | 1/2018 |
| TW | I635213 | B | 9/2018 |
| WO | 2019/228594 | A1 | 12/2019 |
| WO | WO 2020259748 | A1 | 12/2020 |

OTHER PUBLICATIONS

Partial Supplementary European Search Report, dated Jul. 1, 2025, for European Application No. 22858977.6-1009 / 4388166 PCT/ US2022040234, 15 pages.
International Search Report and Written Opinion of the International Searching Authority, mailed Nov. 7, 2022, for International Application No. PCT/US2022/040234, 15 pages.

* cited by examiner

FLIGHT DECK BARRIER APPARATUS

CROSS-REFERENCE TO RELATED APPLICATIONS

The present application claims the benefit of U.S. Provisional Patent Application No. 63/233,677, filed Aug. 16, 2021, which is entirely incorporated by reference herein.

BACKGROUND

Technical Field

The present disclosure generally relates to aircraft flight deck security apparatuses.

Description of the Related Art

Aircrafts can be segregated into flight deck and passenger deck, among other regions/sections. The flight deck includes a flight cockpit door that allows ingress and egress for pilots and other flight crew. To secure the flight cockpit door from unauthorized entry, the flight deck is generally partitioned from the passenger deck via rigid doors, or a steel-wire fence. By partitioning the flight deck from the passenger deck, pilots and other flight crew may access restrooms, food service, etc., without compromising safety of the flight crew by providing unauthorized access to the flight cockpit.

Conventional partitioning apparatuses and devices, for example, may include a steel wire fence or other types of rigid doors, which are costly and labor-intensive to manufacture, assemble, and maintain. Further, such conventional partitioning apparatuses and devices increase a weight footprint of an aircraft.

Conventional partitioning apparatuses and devices, for example, may limit movement of the pilot and the flight crew based on a footprint of the conventional partitioning apparatuses and device when opened such that the flight cockpit door is readily accessible. For example, a first jamb at a left-hand side and a second jamb at a right-hand side of a conventional partitioning apparatus and device may narrow the aisle limiting movement of an individual when passing between the first jamb and the second jamb.

Conventional partitioning apparatuses and devices, for example, may be difficult to open and close securely when the aircraft is in flight to a destination. For example, if the conventional partitioning apparatus and device is a steel wire fence, the steel wire fence may need to be rotated to be opened in an emergency situation, and, if turbulence occurs, the steel wire fence may open more quickly than expected causing the steel wire fence to swing into an individual (e.g., flight deck crew member opening the steel wire fence). The unexpected swinging of the steel wire fence may injure the individual (e.g., flight deck crew member opening the steel wire fence) opening the steel wire fence.

BRIEF SUMMARY

The present disclosure is directed to a partition barrier including a foldable barrier, which is folded up when in a stowed position and is expanded and fanned out (e.g., unfolded) when in an expanded position. In the expanded position, the foldable barrier limits, prevents, or denies access to a flight deck of an aircraft to reduce the likelihood of unpermitted, uncertified, or unapproved access to the flight deck. In the stowed position, the foldable barrier does not limit, prevent, or deny access to the flight deck as the foldable barrier is folded up in the stowed position such that an individual may readily pass through a frame of the partition barrier to access the flight deck of the aircraft.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify the same or similar elements or acts unless the context indicates otherwise. The sizes and relative proportions of the elements in the drawings are not necessarily drawn to scale. For example, some of these elements may be enlarged and positioned to improve drawing legibility.

DETAILED DESCRIPTION

Figure 1A:
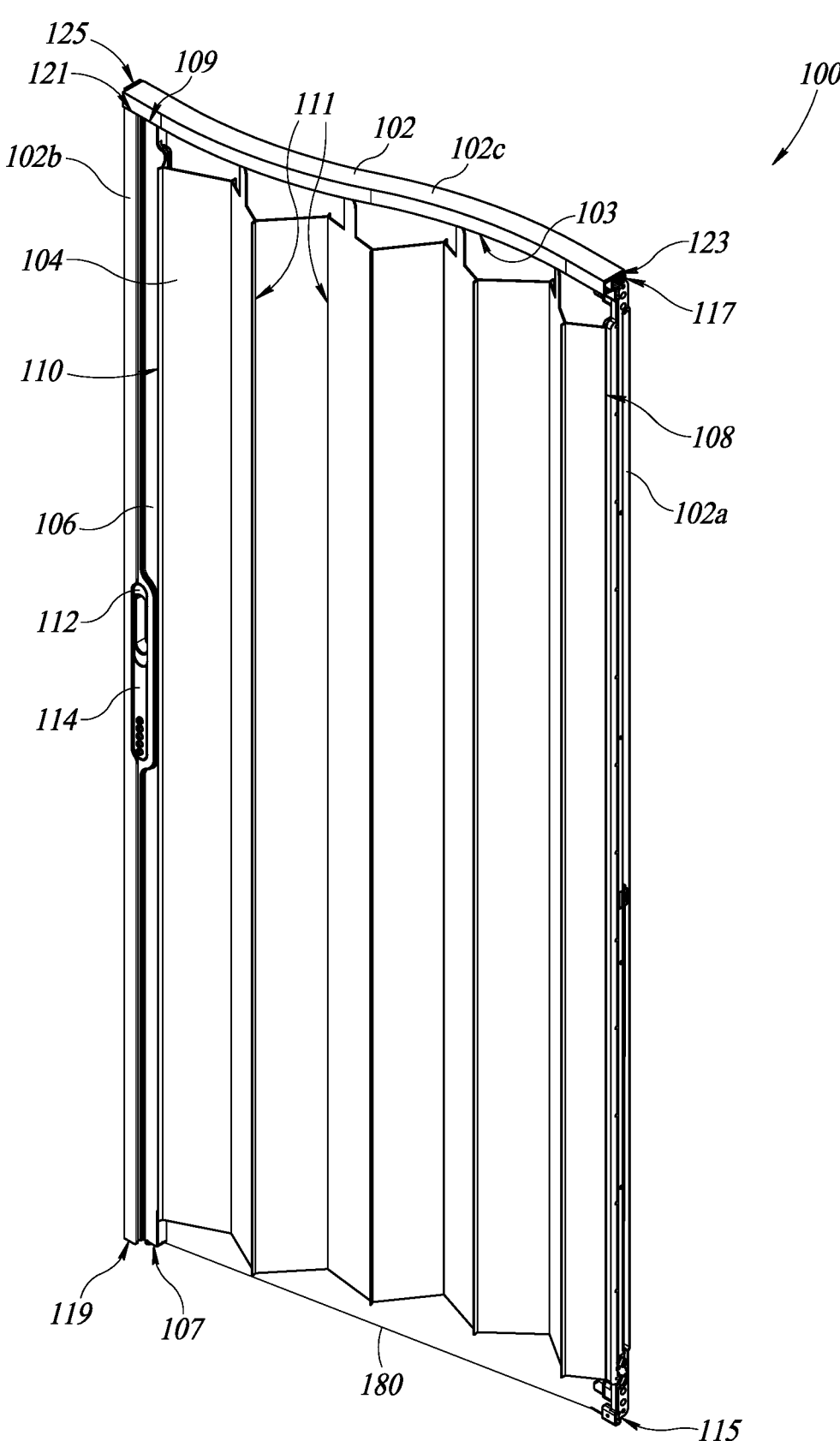
FIG. 1A illustrates a perspective view of an embodiment of a flight deck barrier of the present disclosure with a foldable barrier in an expanded position.

In the following description, certain specific details are set forth in order to provide a thorough understanding of various embodiments of the disclosure. However, one skilled in the art will understand that the disclosure may be practiced without these specific details. In other instances, well-known structures associated with aircraft flight deck doors have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second, third, etc., does not necessarily imply a ranked sense of order, but rather may only distinguish between multiple instances of an act or a similar structure or material.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms "top," "bottom," "upper," "lower," "left," and "right," are used for only discussion purposes based on the orientation of the components in the discussion of the figures in the present disclosure as follows. These terms are not limiting as the possible positions explicitly disclosed, implicitly disclosed, or inherently disclosed in the present disclosure.

The term "substantially" is used to clarify that there may be slight differences and variation when a package is manufactured in the real world, as nothing can be made perfectly equal or perfectly the same. In other words, "substantially"

means and represents that there may be some slight variation in actual practice and instead is made or manufactured within selected tolerances.

As used in this specification and the appended claims, the singular forms "a," "an," and "the" include plural referents unless the content clearly dictates otherwise.

While one embodiment is shown and described with respect to partition barriers, it will be readily appreciated that embodiment of the present disclosure is not limited thereto. In various embodiments, the structures, devices, methods and the like described herein may be embodied in or otherwise utilized in any suitable types of partition barriers to limit access to a flight deck of an aircraft.

The present disclosure is directed to at least one embodiment of a partition barrier improving a user's ease of use of the partition barrier that improves safety and reduces a likelihood of injuring a user when the aircraft is underway (e.g., shift in movement due to turbulence) as the partition barrier does not rotate clockwise or counterclockwise.

The present disclosure is directed to a partition barrier including a foldable barrier, which is folded up when in a stowed position and is expanded and fanned out (e.g., unfolded) when in an expanded position. In the expanded position, the foldable barrier limits, prevents, or denies access to a flight deck of an aircraft to reduce the likelihood of unpermitted, uncertified, or unapproved access to the flight deck. In the stowed position, the foldable barrier does not limit, prevent, or deny access to the flight deck as the foldable barrier is folded up in the stowed position such that an individual may readily pass through a frame of the partition barrier to access the flight deck.

A first end of the foldable barrier is mechanically coupled to a first jamb of the frame, and a second end of the foldable barrier is mechanically coupled to an edge beam that moves along with the foldable barrier when moved from the expanded position to the stowed position and vice versa. A second jamb of the frame is opposite to the first jamb, and a header of the frame extends from the first jamb to the second jamb. The header includes a track that is in mechanical cooperation with a plurality of tabs at the top end of the foldable barrier. The plurality of tabs move along the track of the header when moving the foldable barrier from the stowed position to the expanded position and vice versa.

The foldable barrier may be a curtain including reinforced materials that are not easily broken by use of tools such as knives, power tools, guns (e.g., bullets), or other similar or like devices an individual may utilize to try and break through the foldable barrier to access the flight deck. The reinforced materials of the curtain may be of low weight reducing a weight footprint of the partition barrier.

The first jamb includes a first latch and a second latch that interlock with the edge beam when the foldable barrier is in the stowed position. The first and second latches interlock with the edge beam such that the foldable barrier is securely locked in the stowed position and remains folded up (e.g., compressed) to provide access to the flight deck of the aircraft.

The second jamb includes a third latch, a fourth latch, and a fifth latch that interlock with the edge beam when the foldable barrier is in the expanded position. The third, fourth, and fifth latches interlock with the edge beam such that the foldable barrier is securely locked in the expanded position and limits access to the flight deck of the aircraft.

The edge beam further includes a combination lock that mechanically cooperates with the first and second latches when the foldable barrier is in the stowed position, and mechanically cooperates with the third, fourth, and fifth latches when the foldable barrier is in the expanded position. The combination lock limits access to moving the foldable barrier from the stowed position to the expanded position and vice versa to only individuals (e.g., flight deck crew, pilots, sky marshals, etc.) that know a combination for the combination lock. The combination lock along with the first and second latches securely locks the foldable barrier in the stowed position to provide access to the flight deck, and the combination lock along with the third, fourth, and fifth latches securely locks the foldable barrier in the expanded position to limit access to the flight deck.

A pulley system includes a plurality of pulleys at the first jamb, a cable in mechanical cooperation with the pulleys, and an extension spring at the first jamb in mechanical cooperation with the cable. A top end of the edge beam is mechanically coupled to a first end of the cable and a bottom end of the edge beam is mechanically coupled to a second end of the cable opposite to the first end of the cable. The pulley system is configured to distribute a load applied to the edge beam at a location along the edge beam offset from a center of the edge beam inversely proportional to respective distances the location is from the top end and bottom end of the edge beam. The load being distributed evenly when applied offset from the center of the edge beam reduces the likelihood of the edge beam not interlocking with the first and second latches when moved to the stowed position. Alternatively, the load being distributed evenly when applied offset from the center of the edge beam reduces the likelihood of the edge beam not interlocking with the third, fourth, and fifth latches when moved to the expanded position.

The latches, the plurality of pulleys, and the frame along with the foldable barrier of the partition barrier improve ease of use of the partition barrier and reduce the likelihood of injury as compared to conventional partitioning apparatuses and devices as discussed above while at the same time securely limiting access to the flight deck of the aircraft.

Figure 1B:
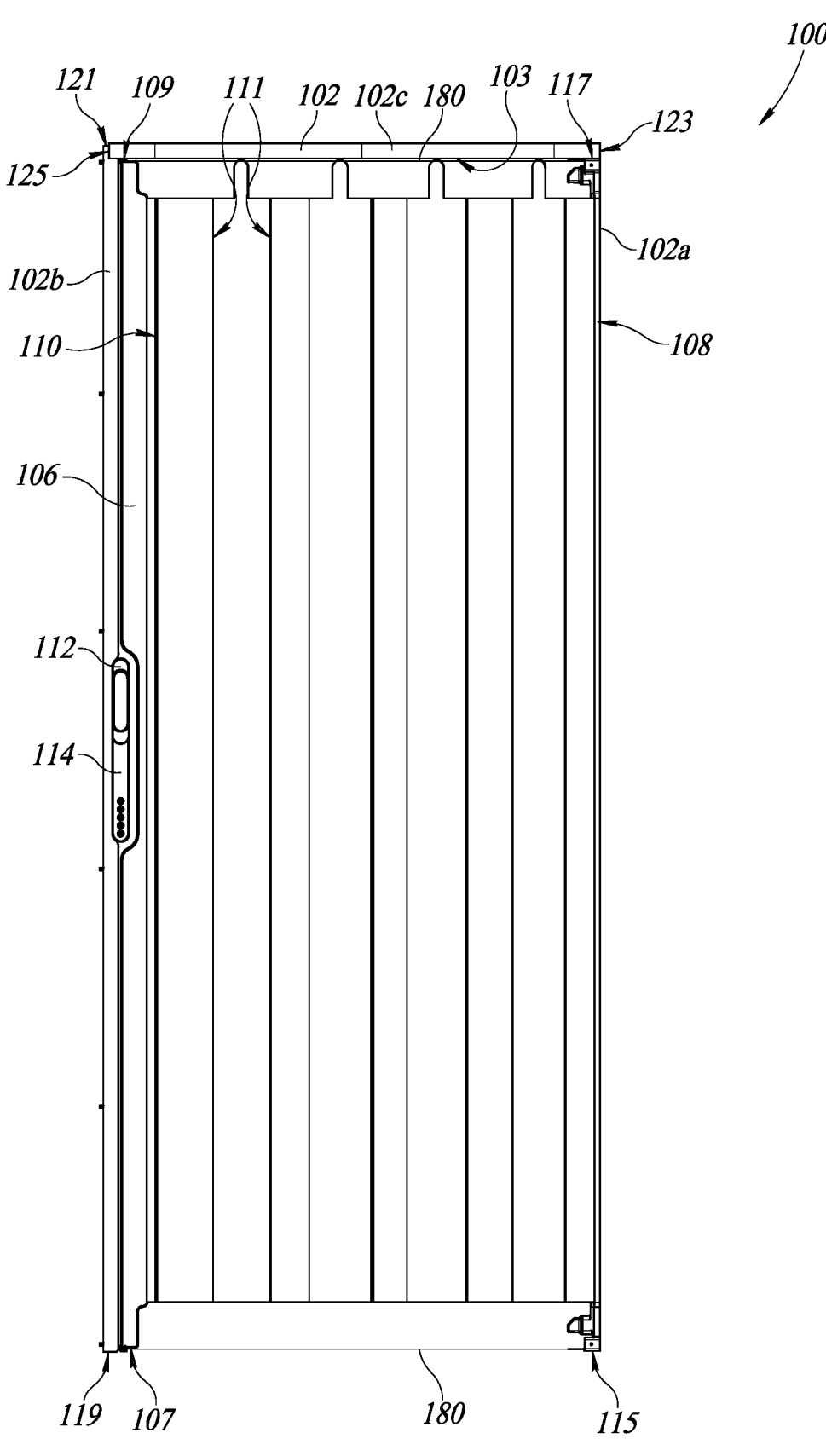
FIG. 1B illustrates a front view of the embodiment of the flight deck barrier as shown in FIG. 1A with the foldable barrier in the expanded position.

FIG. 1A illustrates a perspective view of a flight deck barrier 100 including a frame 102, a foldable barrier 104, and an edge beam 106 mechanically coupled to the foldable barrier 104. FIG. 1B illustrates a front view of the flight deck barrier 100 as shown in FIG. 1A. In FIGS. 1A and 1B, the foldable barrier 104 is in an expanded position.

The frame 102 includes a first jamb 102a, a second jamb 102b opposite to the first jamb 102a, and a header 102c that extends from a top end of the first jamb 102a to a top end of the second jamb 102b. The header 102c includes a first track 103 (e.g., a pathway) within the header 102c. The first track 103 may be a recess, an indentation, or some other type of track or pathway within the header 102c. The first track 103 may more readily be seen in FIGS. 5B and 6C of the present disclosure. The first jamb 102a, the second jamb 102b, and the header 102c may be mechanically coupled to walls and ceilings delimiting an aisle of an aircraft, for example, by a plurality of fasteners (e.g., screws, rivets, or some other suitable type of fastener to mechanically couple the frame 102 to walls and ceilings of the aircraft).

The foldable barrier 104 has a first end 108 and a second end 110 opposite to the first end. The first end 108 of the foldable barrier 104 is mechanically coupled to the first jamb 102a. The second end 110 of the foldable barrier 104 is mechanically coupled to the edge beam 106. For example, the first end 108 may be mechanically coupled to the first jamb 102a and the second end 110 may be mechanically coupled to the edge beam 106 by respective ones of pluralities of fasteners (e.g., screws, rivets, or some other suitable type of fastener to mechanically couple the frame 102 to walls and ceilings of the aircraft). The foldable barrier 104 has an accordion-like structure in which the foldable barrier 104 folds up when in a stowed position as may be readily seen in FIGS. 1C and 1D. For example, the foldable barrier 104 includes a plurality of folds 111 that provide the foldable barrier 104 to be folded up in the stowed position.

The foldable barrier 104 may be a curtain including reinforced materials that are not easily broken by use of tools such as knives (e.g., stab proof), power tools, guns (e.g., bullet proof), or other similar or like devices an individual may utilize to try and break through the foldable barrier to access the flight deck. The reinforced materials of the curtain may be of low weight reducing a weight footprint of the partition barrier. For example, the reinforced materials may include a Kevlar material, a fiberglass material, a polyethylene material, a polycarbonate material, or some other type of material to reinforce the foldable barrier 104 from being torn or broken through by an individual without permission to access a flight deck of an aircraft. The foldable barrier 104 may include a combination of the reinforced materials that are interwoven or in a stacked configuration to further reduce the likelihood of the foldable barrier 104 being torn or broken through by an individual without permission to access a flight deck of an aircraft.

The edge beam 106 includes a handle 112 and a combination lock 114 that is in mechanical cooperation with the handle 112. For example, when the foldable barrier 104 is in the expanded position, the edge beam 106 interlocks with strikers along the second jamb 102b interlocking the edge beam 106 with the second jamb 102b. A latching mechanism is in mechanical cooperation and/or communication with the handle 112 and the combination lock 114. For example, the edge beam 106 may be unlocked from being interlocked with the second jamb 102b by a user inputting a code (e.g., flight crew, pilot, or some other individual with permission to unlock the combination lock 114 by knowing the code) into the combination lock 114, which unlocks the latching mechanism such that the handle 112 may articulate the latching mechanism. After the handle 112 is able to articulate the latching mechanism, the user may then push down and pull on the handle 112 to unlock the edge beam 106 from the second jamb 102b and move the edge beam 106 to the right based on the orientation as shown in FIG. 1A towards the first jamb 102a.

When the foldable barrier 104 is in the stowed position, the edge beam 106 interlocks with strikers along the first jamb 102a interlocking the edge beam 106 with the first jamb 102a. The latching mechanism may not be articulable unless a code is input into the combination lock 114. For example, the edge beam 106 may be unlocked from being interlocked with the first jamb 102a by a user inputting a code (e.g., flight crew, pilot, or some other individual with permission to unlock the combination lock 114 by knowing the code) into the combination lock 114, which unlocks the latching mechanism such that the handle 112 is able to articulate the latching mechanism. After the latching mechanism is articulable by the handle 112, the user may then push down and pull on the handle 112 to unlock the edge beam 106 from the first jamb 102a and move the edge beam 106 to the left based on the orientation as shown in FIG. 1A towards the second jamb 102b.

Figure 1C:
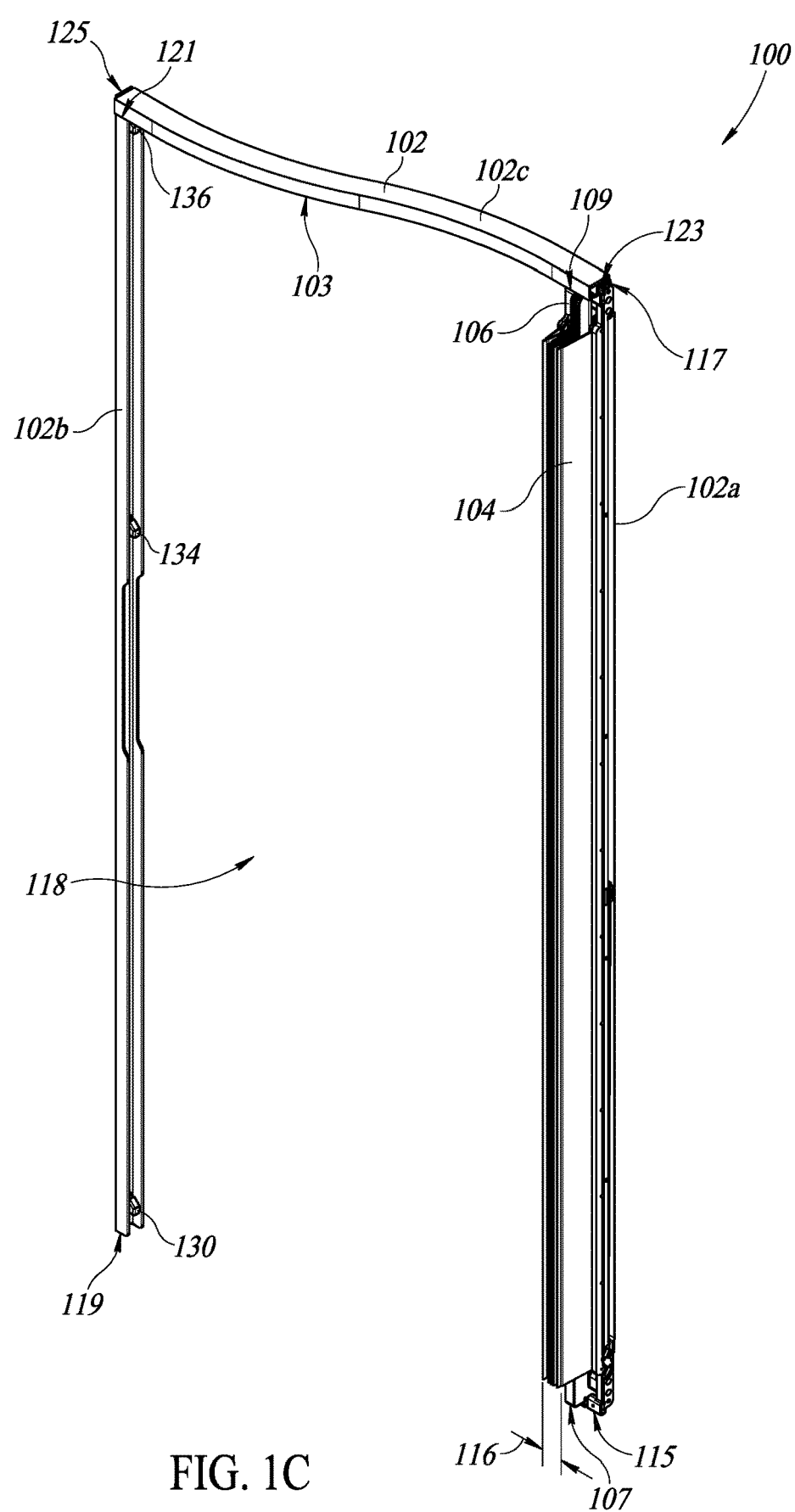
FIG. 1C illustrates a perspective view of the embodiment of the flight deck barrier as shown in FIGS. 1A and 1B with the foldable barrier in a stowed position.
Figure 1D:
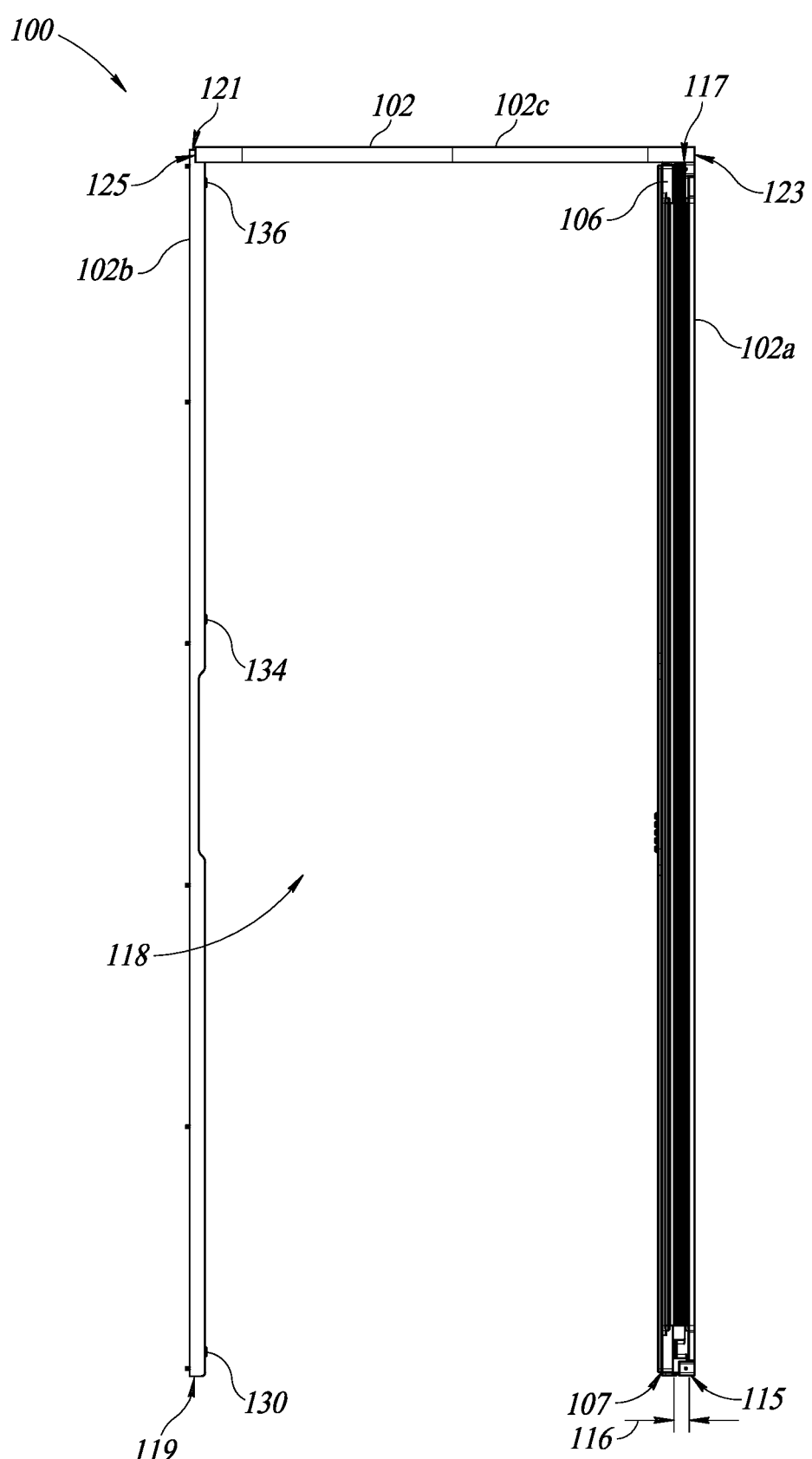
FIG. 1D illustrates a front view of the embodiment of the flight deck barrier as shown in FIGS. 1A, 1B, and 1C with the foldable barrier in the stowed position.

The combination lock 114 locking the latching mechanism, which is in mechanical cooperation and/or communication with the handle 112, stops an unauthorized individual (e.g., does not have permission, certification, or approval to enter a flight deck of an aircraft such as a passenger) from unlocking the edge beam 106 from respective strikers along the first and second jambs 102a, 102b, respectively. For example, the unauthorized individual may not deploy the foldable barrier 104 from the stowed position as shown in FIGS. 1C and 1D to the expanded position as shown in FIGS. 1A and 1B. Similarly, the unauthorized individual may not compress or fold up the foldable barrier 104 from the expanded position as shown in FIGS. 1A and 1B to the stowed position as shown in FIGS. 1C and 1D. In other words, the unauthorized individual may not utilize the flight deck barrier 100 improving security of a flight deck of an aircraft.

The edge beam 106 includes a bottom end 107 and a top end 109 opposite to the bottom end 107. The edge beam 106 has openings adjacent to the bottom and top ends 107, 109 or between the bottom and top ends 107, 109 in which respective strikers along the first and the second jambs 102a, 102b, respectively are inserted into when the edge beam 106 interlocks with these respective strikers of the first jamb 102a or the second jamb 102b.

The first jamb 102a includes a bottom end 115 and a top end 117 opposite to the bottom end 115 of the first jamb 102a. The second jamb 102b includes a bottom end 119 and a top end 121 opposite to the bottom end 119. The header 102c includes a first end 123 and a second end 125 opposite to the first end of the header 102c. The first end 123 is adjacent to the top end 117 of the first jamb 102a, and the second end 125 is adjacent to the top end 121 of the second jamb 102b. For example, the first end 123 of the header 102c may be mechanically coupled to the top end 117 of the first jamb 102a by a plurality of fasteners (e.g., screws, rivets, nuts, bolts, or some other suitable fastener), and the second end 125 of the header 102c may be mechanically coupled to the top end 121 of the second jamb 102b by a plurality of fasteners (e.g., screws, rivets, nuts, bolts, or some other suitable fastener).

The first jamb 102a may be coupled to a respective wall delimiting an aisle or pathway of an aircraft by a plurality of fasteners. The second jamb 102b may be coupled to a respective wall delimiting an aisle or pathway of an aircraft by a plurality of fasteners. The header may be coupled to a ceiling delimiting an aisle or pathway of an aircraft by a plurality of fasteners.

FIG. 1C illustrates a perspective view of the flight deck barrier 100 as shown in FIGS. 1A and 1B. FIG. 1D illustrates a front view of the flight deck barrier 100 as shown in FIGS. 1A, 1B, and 1C. However, unlike FIGS. 1A and 1B, in FIGS. 1C and 1D, the foldable barrier 104 is in a stowed position.

As shown in FIGS. 1C and 1D, when the foldable barrier 104 is in the stowed position, the foldable barrier 104 is folded up having a thickness 116 as shown in FIGS. 1C and 1D. The foldable barrier 104 extends into an aisle or pathway of an aircraft by a limited amount so as to reduce the effect of limiting a movement of a member of a flight deck crew, a pilot, or another individual when passing through an opening 118 of the frame 102. The opening 118 of the frame extends between the first jamb 102a, the second jamb 102b, and the header 102c.

Figure 2A:
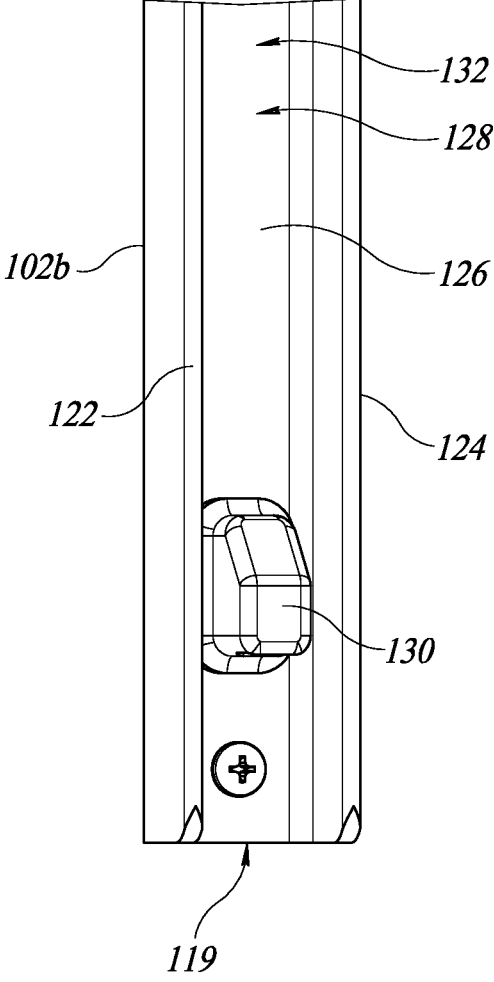
FIG. 2A illustrates an enlarged view of a respective striker at a bottom end section of a respective jamb of a frame of an embodiment of a flight deck barrier of the present disclosure.
Figure 2B:
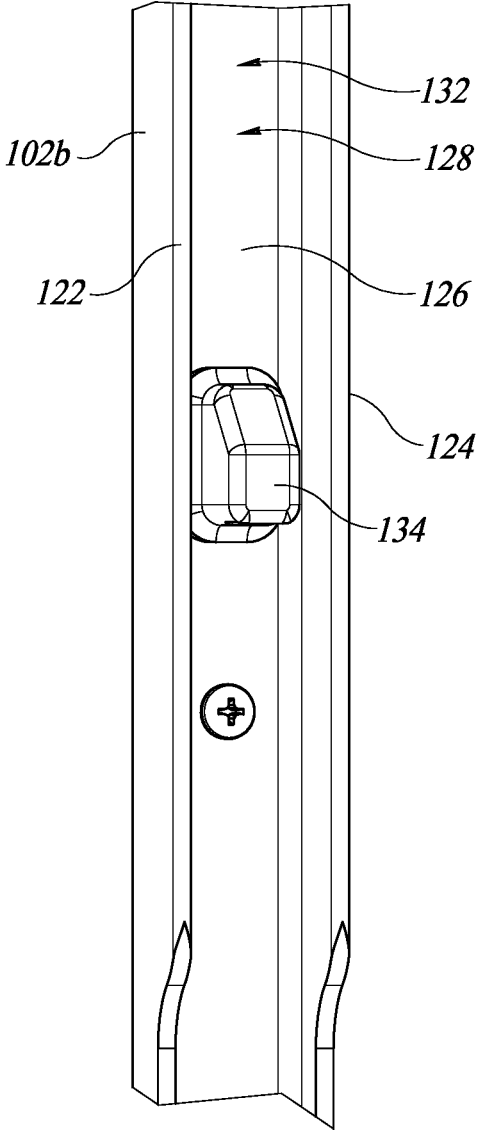
FIG. 2B illustrates an enlarged view of a respective striker at a middle section of the respective jamb as shown in FIG. 2A.
Figure 2C:
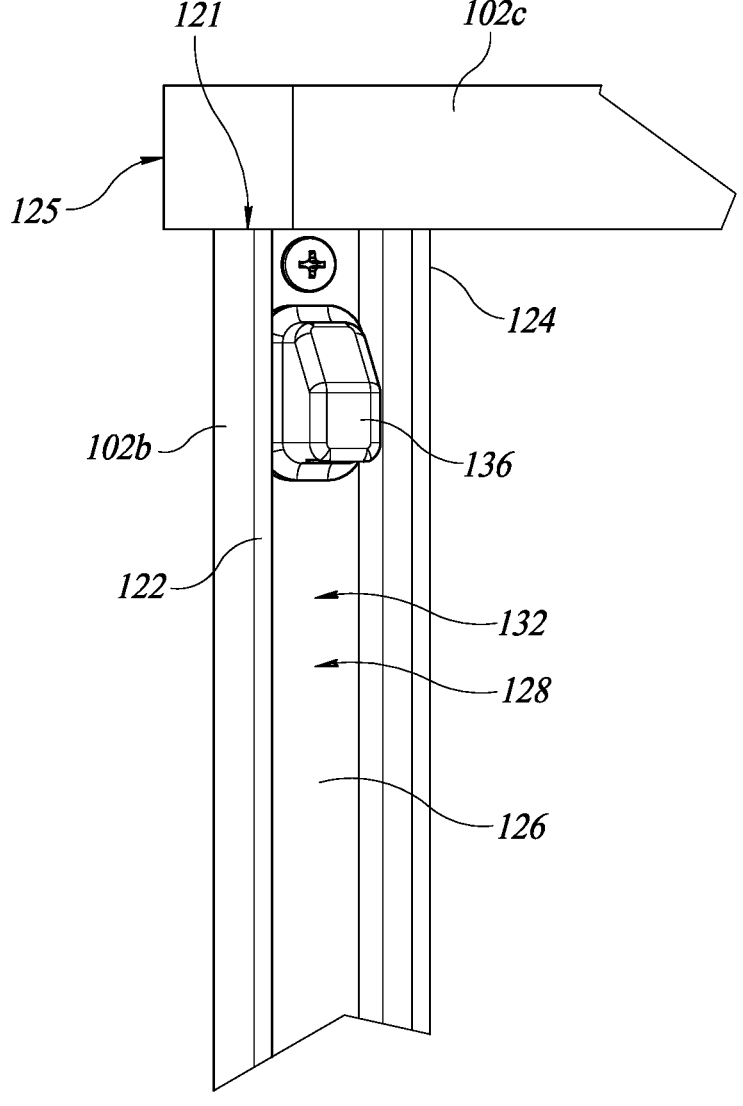
FIG. 2C illustrates an enlarged view of a respective striker at a top end section of the respective jamb as shown in FIGS. 2A and 2B.

FIG. 2A is an enlarged view of a bottom end 119 of the second jamb 102b. The second jamb 102b as shown in FIGS. 2A-2C is a U-channel beam including a first flange 122 and a second flange 124 opposite to the first flange 122. A web portion 126 extends from the first flange 122 to the second flange 124. A recess 128 extends from the first flange 122 to the second flange 124. In some alternative embodiments, the second jamb 102b may be a C-channel beam, an I-channel beam, or some other suitable type of flanged channel beam.

A first striker 130 is present at a surface 132 of the web portion 126 and the striker 130 is adjacent to the bottom end 119 of second jamb 102b. The first striker 130 extends outward from the surface 132 of the web portion 126, the first striker 130 is between the first flange 122 and the second flange 124, and the first striker 130 is in the recess 128. The first striker 130 may be mechanically coupled to the web portion 126 by a fastener.

FIG. 2B is an enlarged view of a middle section of the second jamb 102b between the bottom end 119 and the top end 121 of the second jamb 102b. A second striker 134 is present at the surface 132 of the web portion 126. The second striker 134 extends outward from the surface 132 of the web portion 126, the second striker 134 is between the first flange 122 and the second flange 124, and the second striker 134 is in the recess 128. The second striker 134 is at a location along the second jamb 102b between the bottom end 119 and the top end 121 of the second jamb 102b.

FIG. 2C is an enlarged view of the top end 121 of the second jamb 102b. A third striker 136 is present at the surface 132 of the web portion 126 and is adjacent to the top end 121 of the second jamb 102b. The third striker 136 is between the first flange 122 and the second flange 124, and the third striker 136 is in the recess 128. The third striker 136 may be mechanically coupled to the web portion 126 by a fastener.

While the embodiment as shown in FIGS. 2A-2C includes the first, second, and third strikers 130, 134, 136 mechanically coupled to the second jamb 102b, in some other embodiments, the second jamb 102b may have fewer than three strikers or may have more than three strikers. The embodiment as shown in FIGS. 2A-2C includes the first, second, and third strikers 130, 134, 136 interlock with the edge beam 106 such that the edge beam 106 remains interlocked with the first, second, and third strikers 130, 134, 136 when an aircraft is underway and flies through irregular or violent waves of air that result in turbulence. The first, second, and third strikers 130, 134, 136 may reduce the likelihood of an individual who does not have permission to open or close the flight deck barrier 100 being able to break away the edge beam 106 from the first, second, and third strikers 130, 134, 136 by utilizing physical force or tools (e.g., knives, guns, power tools, lock picking tools, or some other type of tool that may be utilized to obtain unauthorized access through the flight deck barrier 100) to break away the edge beam 106 from the first, second, and third strikers 130, 134, 136. In other words, by increasing a number of strikers along the second jamb 102b, the interlocking strength between the edge beam 106 and respective strikers along the second jamb 102b may be increased, which reduces the likelihood of an individual without permission, certification or approval to accessing a flight deck of an aircraft.

While not enlarged like the second jamb 102b as shown in FIGS. 2A-2C, the first jamb 102a and the header 102c may be U-channel beams the same or similar to the second jamb 102b as described above with respect to FIGS. 2A-2C. For example, the first jamb 102a may be a U-channel beam and the header 102c may be a U-channel beam. In some alternative embodiments, the first jamb 102a and the header 102c may be a C-channel beam, an I-channel beam, or some other suitable type of flanged channel beam.

In some alternative embodiments, the first jamb 102a, the second jamb 102b, and the header 102c may be different channel beams relative to each other. For example, the first and second jambs 102a, 102b may be U-channel beams and the header 102c may be a C-channel beam.

Figure 3A:
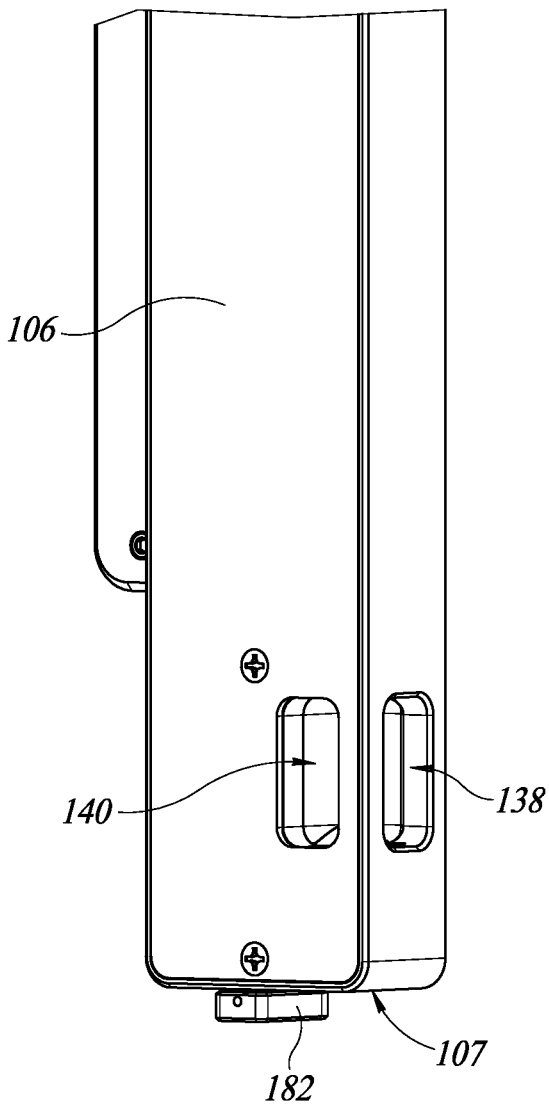
FIG. 3A illustrates an enlarged view of a bottom end section of an embodiment of an edge beam of an embodiment of a flight deck barrier of the present disclosure.

FIG. 3A is an enlarged rear view of the bottom end 107 of the edge beam 106. The edge beam 106 includes a first opening 138 and a second opening 140 that extend into the edge beam 106. The first opening 138 and the second opening 140 may extend to each other such that the first opening 138 and the second opening 140 are a tunnel that extends through the edge beam 106. The tunnel may have an L-shape or an L-like shape in which the first opening 138 is transverse to the second opening 140. As shown in FIG. 3A, the first opening 138 extends into the edge beam 106 in a first direction, and the second opening 140 extends into the edge beam 106 in a second direction transverse to the first direction. A respective centerline of the first opening 138 may be perpendicular to a respective centerline of the second opening 140.

Figure 3B:
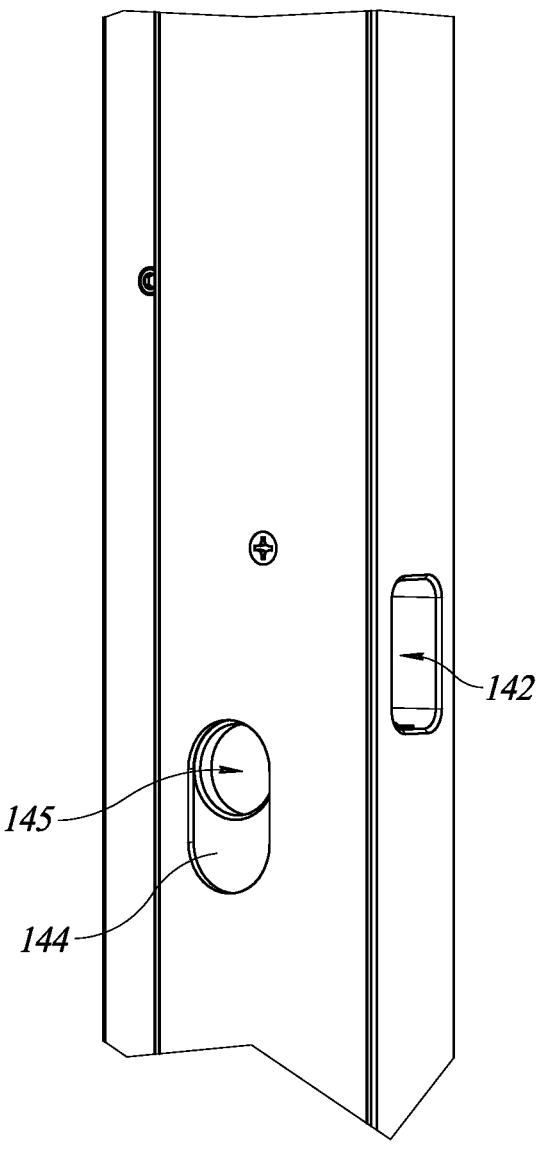
FIG. 3B illustrates an enlarged view of a middle section of the edge beam as shown in FIG. 3A.

FIG. 3B is an enlarged rear view of a middle section of the edge beam 106 between the bottom end 107 and the top end 109 of the edge beam 106. A third opening 142 extends into the edge beam 106 in the first direction. The third opening 142 terminates within the edge beam 106. An unlock component 144 is present at a rear side of the edge beam 106, and the unlock component 144 includes hole 145 (e.g., finger hole). The unlock component 144 is in mechanical cooperation with the combination lock 114 such that the edge beam 106 may be unlocked at the rear side of the edge beam 106 without having to input a code into the combination lock 114. For example, when the foldable barrier 104 is in the expanded position, a pilot whom is present at a flight deck of an aircraft may readily unlock the edge beam 106 from the second jamb 102*b* by placing their finger in the hole 145 in the unlock component 144 to push or pull down the unlock component 144. By pushing or pulling down the unlock component 144, the edge beam 106 unlocks from the second jamb 102*b* such that the pilot may move the foldable barrier 104 from the expanded position to the stowed position as shown in FIGS. 1A and 1C. The pilot may need to move the foldable barrier 104 from the expanded position to the stowed position due to an emergency during flight of an aircraft, or the pilot may need to move the foldable barrier 104 to leave the flight deck of the aircraft after the aircraft has landed and passengers have exited the aircraft into a terminal of an airport.

Figure 3C:
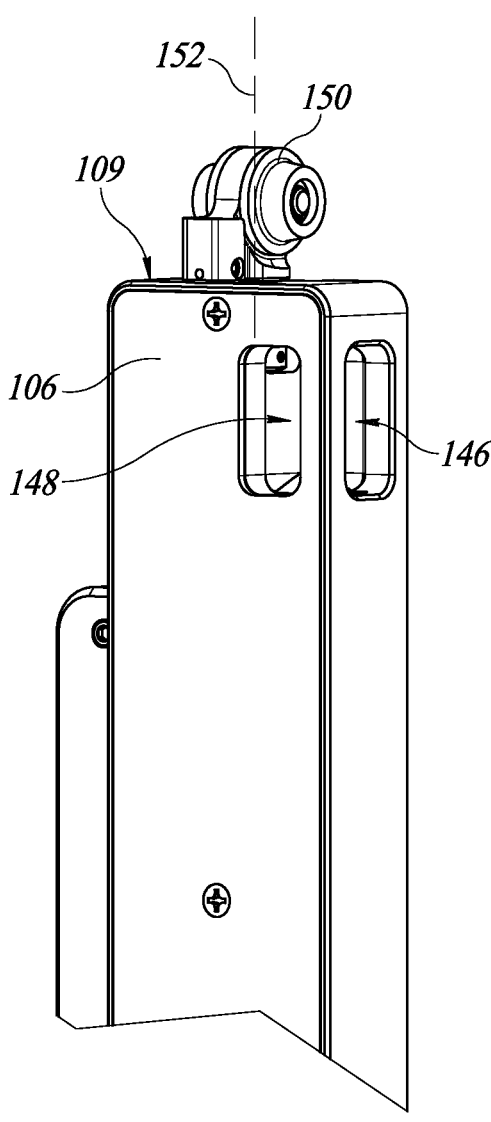
FIG. 3C illustrates an enlarged view of a top end section of the edge beam as shown in FIGS. 3A and 3B.

FIG. 3C is an enlarged rear view of the top end 109 of the edge beam 106. The edge beam 106 includes a fourth opening 146 and a fifth opening 148 that extend into the edge beam 106. The fourth opening 146 and the fifth opening 148 may extend to each other such that the fourth opening 146 and the fifth opening 148 are a tunnel that extends through the edge beam 106. The tunnel may have an L-shape or an L-like shape in which the fourth opening 146 is transverse to the fifth opening 148. As shown in FIG. 3C, the fourth opening 146 extends into the edge beam 106 in the first direction, and the fifth opening 148 extends into the edge beam 106 in the second direction transverse to the first direction. A respective centerline of the fourth opening 146 may be perpendicular to a respective centerline of the fifth opening 148.

A roller component 150 is present at the top end 109 of the edge beam 106. The roller component 150 pivots about an axis 152 of the roller component 150 as shown in FIG. 3C. For example, the roller component 150 pivots in either a counterclockwise or a clockwise direction about the axis 152. In other words, the roller component 150 has a degree of freedom about the axis 152 such that the roller component 150 pivots, rotates, or spins freely about the axis 152 of the roller component 150. The axis 152 may be a vertical axis based on the orientation as shown in FIG. 3C. The roller component 150 may be a roller, a wheel, or some other type of rotating component that moves along the first track 103. In some alternative embodiments, the roller component 150 may instead be a slide component such as a slider or some other type of slide component that moves along the first track 103. The details of the functionality of the roller component 150 will be discussed in further detail with respect to FIG. 6C of the present disclosure.

Figure 3D:
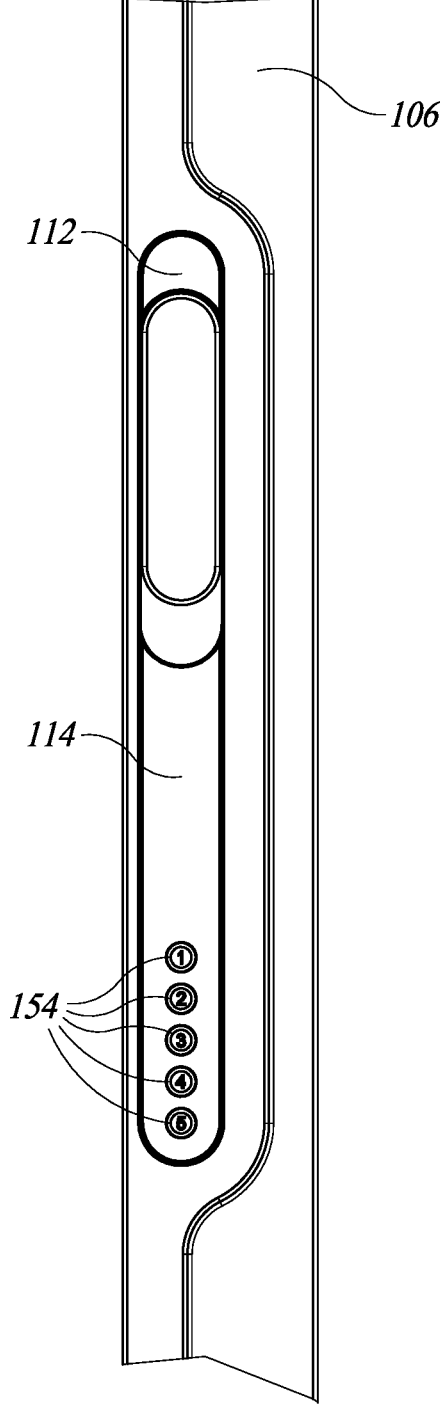
FIG. 3D illustrates an enlarged view of a combination lock of the edge beam as shown in FIGS. 3A, 3B, and 3C.

FIG. 3D illustrates an enlarged view of the handle 112 and the combination lock 114 along the edge beam 106. The combination lock 114 includes a plurality of buttons 154 in which a code may be input by a user (e.g., pilot, flight deck crew member, or some other individual with knowledge of the code) to unlock the handle 112. After unlocking the handle 112, the user may then push or pull downward on the handle 112 unlocking the edge beam 106 from the first, second, and third strikers 130, 134, 136 along the second jamb 102*b* to move the foldable barrier 104 from the expanded position to the stowed position.

Figure 3E:
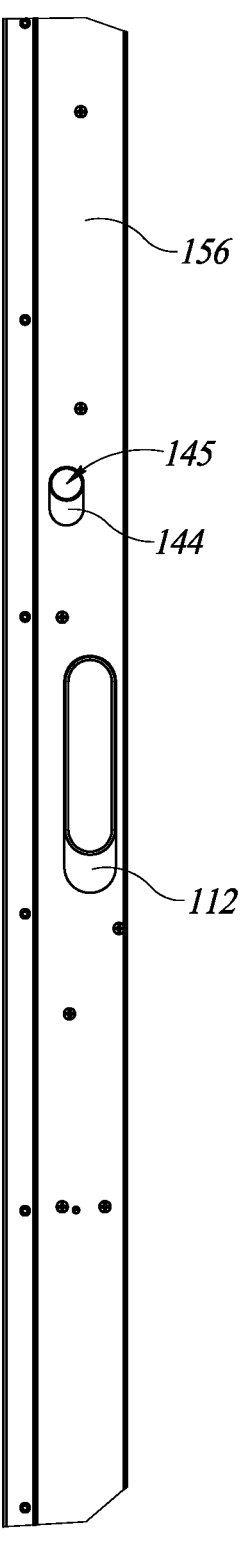
FIG. 3E illustrates an enlarged view of a rear view of the middle section of the edge beam as shown in FIG. 3B.
Figure 3F:
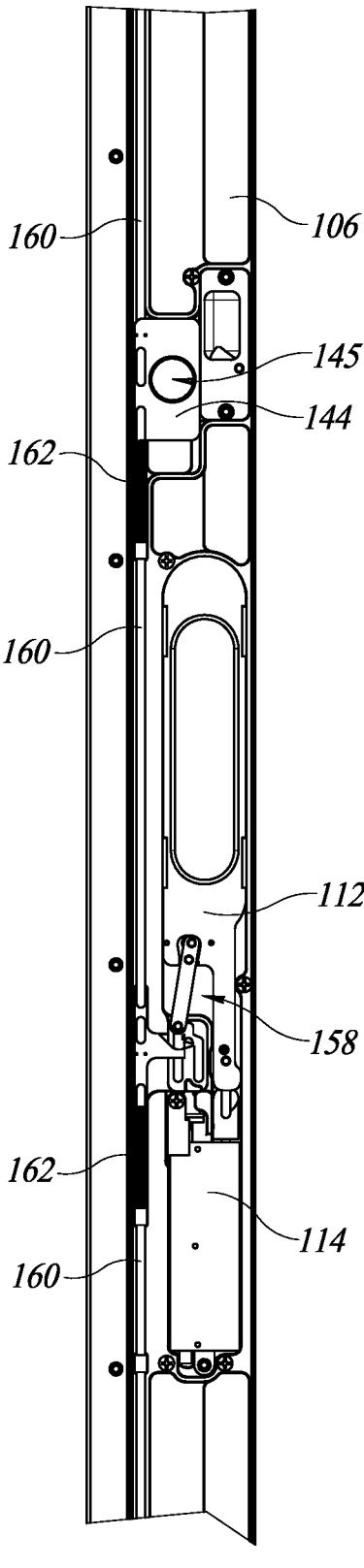
FIG. 3F illustrates an enlarged view of an escapement of the embodiment of the edge beam of the present disclosure.

FIG. 3E illustrates a rear view of an enlarged view of the edge beam 106 including a back plate 156. FIG. 3F illustrates a rear view of an enlarged view of the edge beam 106 with the back plate 156 removed such that an escapement 158 is visible. In some embodiments, the escapement 158 may be a spring loaded escapement. The escapement 158 is in mechanical cooperation with the combination lock 114 and the handle 112. For example, the combination lock 114 may lock the escapement 158 when the edge beam 106 interlocks with the first, second, and third strikers 130, 134, 136 along the edge beam 106 such that the handle 112 cannot unlock the edge beam from the first, second, and third strikers 130, 134, 136. The combination lock 114 may then be unlocked by inputting a code in a manner as discussed earlier utilizing the plurality of buttons 154, at which point the handle may be pushed or pulled downward to mechanically actuate the escapement 158 such that the edge beam 106 unlocks from the first, second, and third strikers 130, 134, 136 to move the foldable barrier 104 from the expanded position to the stowed position. In other words, the combination lock 114 may be in mechanical cooperation with the handle 112 through the escapement 158.

A plurality of rods 160 is in mechanical cooperation with the escapement 158. In some embodiments, at least one of the plurality of rods 160 may be in mechanical cooperation with the combination lock 114 and the handle 112 through the escapement 158. In some alternative embodiments, the rods 160 may be in mechanical cooperation with the handle 112 such that the rod 160 is in mechanical cooperation with the escapement 158 and the combination lock 114 through the handle 112.

The unlock component 144 is in mechanical cooperation with at least one of the plurality of rods 160. For example, the unlock component 144 may be in mechanical cooperation with the rods 160 to bypass entry of a code through the plurality of buttons 154 to unlock the combination lock 114 such that the handle 112 may be actuated and actuate the escapement 158. In other words, the unlock component 144 may be freely actuated to unlock or release the edge beam 106 from the second jamb 102*b* to move the foldable barrier from the expanded position to the stowed position regardless of whether the combination lock 114 is locked or unlocked.

A plurality of springs 162 are in mechanical cooperation with the plurality of rods 160. The plurality of springs 162 are positioned between adjacent ones of the plurality of rods 160 such that ones of the plurality of springs 162 may separate ends of adjacent ones of the plurality of rods 160 from each other. The plurality of springs 162 may be compression springs that compress when a compression force is applied to the plurality of springs 162 utilizing the plurality of rods 160.

Figure 4A:
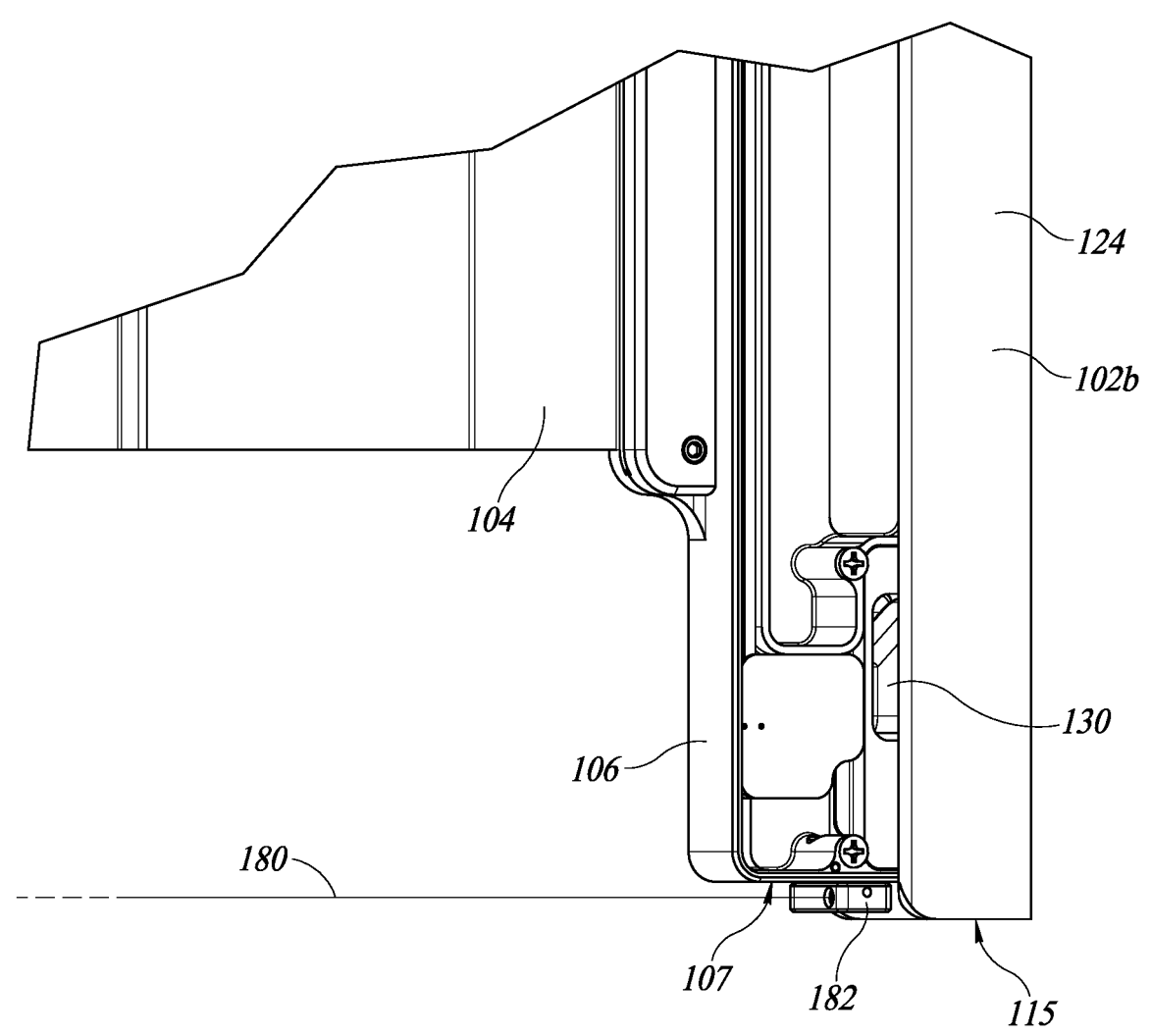
FIG. 4A illustrates an enlarged view of the bottom end section of the embodiment of the edge beam interlocked with and received by the respective jamb as shown in FIGS. 2A-2C.

FIG. 4A illustrates an enlarged rear view of the edge beam 106 mechanically coupled to the first striker 130 present at the bottom end 119 of the second jamb 102b without the back plate 156 present on the edge beam 106. In FIG. 4A, the edge beam 106 is interlocked with the first, second, and third strikers 130, 134, 136 along the second jamb 102b, and the edge beam 106 extends into the recess 128 of the second jamb 102b such that the edge beam 106 is partially within the recess 128.

When the edge beam 106 is interlocked with the first, second, and third strikers 130, 134, 136 along the second jamb 102b, the first opening 138 receives the first striker 130, the third opening 142 receives the second striker 134, and the fourth opening 146 receives the third striker 136. In other words, the first striker 130 is inserted into the first opening 138 and extends into the first opening 138 (see FIG. 4A, the second striker 134 is inserted into the third opening 142 and extends into the third opening 142 (see FIG. 4B), and the third striker 136 is inserted into the fourth opening 146 and extends into the fourth opening 146 (see FIG. 4C). Enough clearance between respective surfaces of the edge beam 106 delimiting the first, third, and fourth openings 138, 142, 146, respectively, is provided such that the first, second, and third strikers 130, 134, 136 are smoothly and easily inserted into the first, third, and fourth openings 138, 142, 146, respectively, without excessive contact or rubbing between the respective surfaces and the first, second, and third strikers 130, 134, 136, respectively.

Figure 4B:
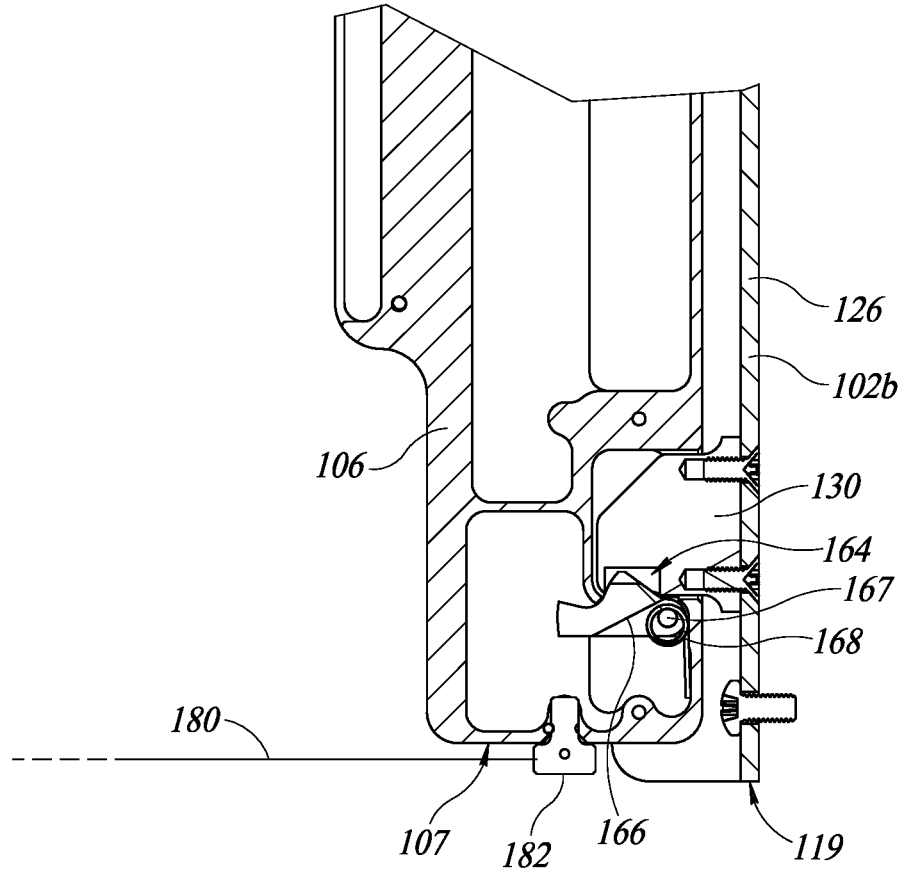
FIG. 4B illustrates an enlarged cross-sectional view of the bottom end section of the embodiment of the edge beam interlocked with and received by the respective jamb as shown in FIG. 4A.

FIG. 4B illustrates a sectional view of the edge beam 106 and the first striker 130 taken along a center of the first striker 130. As can readily be seen in this sectional view of FIG. 4B, the first striker 130 includes a notch 164 that extends into the first striker 130.

When the edge beam 106 is interlocked with the first striker 130, a latch 166 is inserted into the notch 164 such that the latch 166 interlocks with or latches onto the first striker 130 by being inserted into the notch 164. The latch 166 includes an extension 167 that extends outward from the latch 166. The latch 166 may be within the edge beam 106. While not shown, the second striker 134 and third striker 136 each have a notch similar to the notch 164 of the first striker 130.

A torsional spring 168 is on the extension 167 and is in mechanical cooperation with the latch 166. For example, the torsional spring 168 is biased towards the latch 166 being inserted into the notch 164. The torsional spring 168 may be within the edge beam 106.

While not readily visible, the latch 166 is in mechanical cooperation with the plurality of rods 160 and the plurality of springs 162. For example, when the handle 112 or the unlock component 144 is actuated by pushing down or pulling down on either the handle 112 or the unlock component 144, the plurality of rods 160 and the plurality of springs 162 are actuated resulting in enough force being applied to the latch 166 to overcome the bias of the torsional spring 168. The force overcoming the bias of the torsional spring 168 being applied to the latch 166 through the plurality of rods 160 and plurality of springs 162 rotates the latch in a clockwise direction opposed by the bias of the torsional spring 168.

The latch 166 is one of a plurality of latches and the torsional spring 168 is one of plurality of torsional springs. While each one of plurality of latches and the plurality of torsional springs are not shown, each one of the plurality of latches is the same or similar to the latch 166, and each one of the plurality of torsional springs is the same or similar to the torsional spring 168. As there is a total of three strikers (e.g., the first, second, and third strikers 130, 134, 136) along the second jamb 102b in this embodiment, the plurality of latches includes at least three latches and the plurality of torsional springs includes at least three torsional springs. However, it will be readily appreciated that if there are four strikers there would be at least four latches and at least four torsional springs, or, alternatively, if there are five strikers there would be at least five latches and at least five torsional springs.

Each respective latch of the plurality of latches mechanically cooperates with a corresponding one of the first, second, and third strikers 130, 134, 136 when the edge beam 106 is interlocked with the first, second, and third strikers 130, 134, 136 along the second jamb 102b. Each respective latch of the plurality of latches mechanically cooperates with the plurality of rods 160 and the plurality of springs 162 such that each respective latch of the plurality of latches is unlatched from each respective notch of the first, second, and third strikers when the handle 112 or the unlock component 144 is actuated. For example, the plurality of rods 160 and the plurality of springs 162 apply enough force to the plurality of latches to overcome the bias of each one of the plurality of torsional springs such that each one of the plurality of latches rotates in a clockwise direction and unlatches from each notch of the first, second, and third strikers 130, 134, 136, respectively.

When the foldable barrier 104 is moved from the stowed position to the expanded position, the edge beam 106 is partially inserted into the recess 128 such that the plurality of latches interlock with the first, second, and third strikers 130, 134, 136, respectively, to lock the edge beam 106 with the first, second, and third strikers 130, 134, 136, which locks the foldable barrier 104 in the expanded position as well. To interlock the plurality of latches with the first, second, and third strikers 130, 134, 136 the edge beam 106 must be applied with enough force to overcome the bias of the plurality of torsional springs. For example, the user must move the edge beam with enough speed such that the plurality of latches interlock with the first, second, and third strikers 130, 134, 136.

Figure 4C:
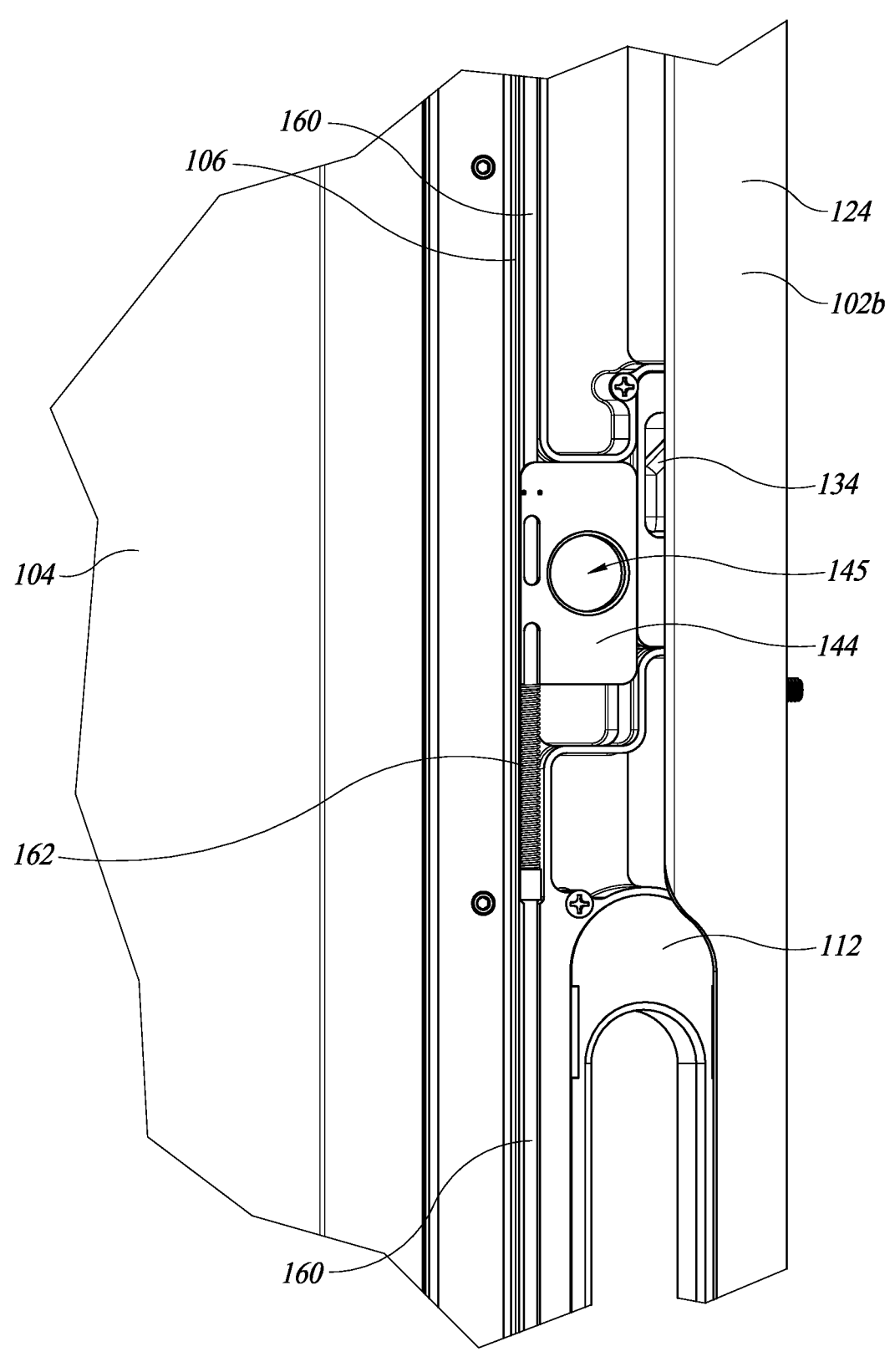
FIG. 4C illustrates an enlarged view of the middle section of the embodiment of the edge beam interlocked with and received by a respective jamb as shown in FIGS. 2A-2C.
Figure 4D:
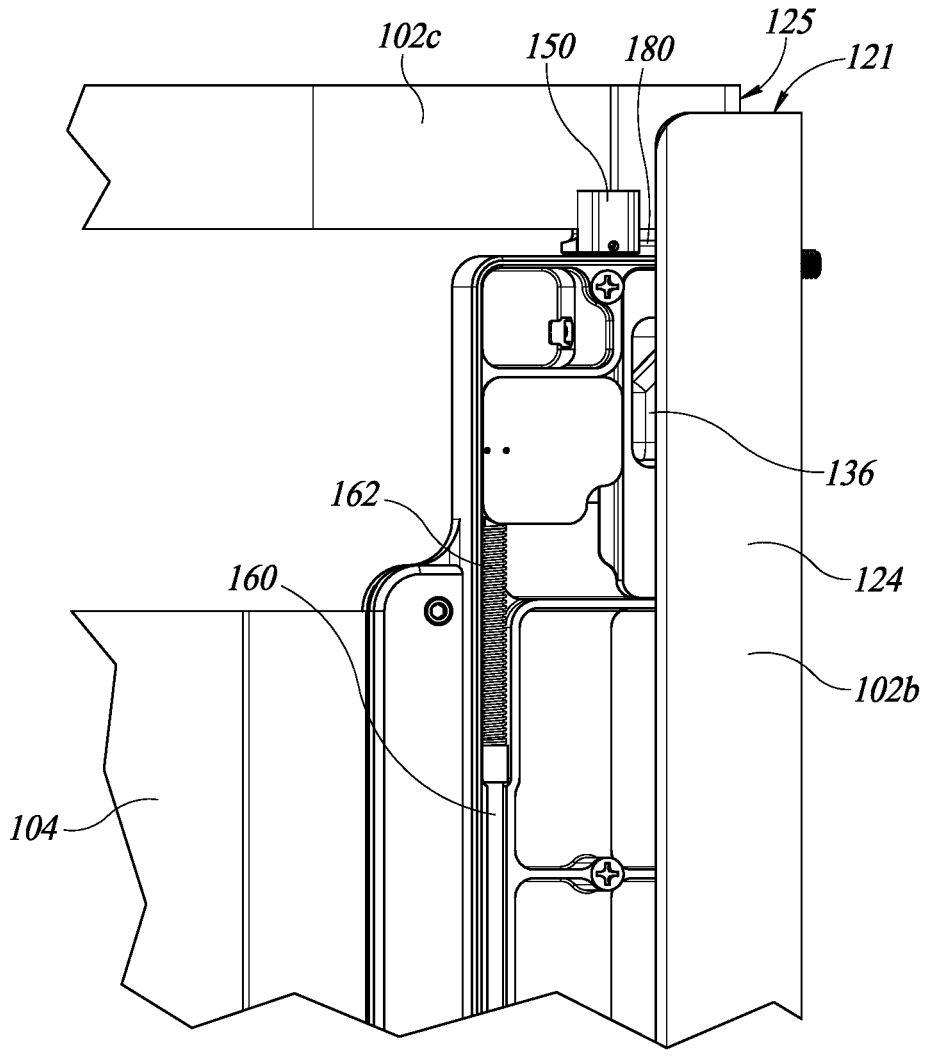
FIG. 4D illustrates an enlarged view of the top end section of the embodiment of the edge beam interlocked with and received by the respective jamb as shown in FIGS. 2A-2C.

FIG. 4C illustrates an enlarged rear view of the edge beam 106 mechanically coupled to the second striker 134 present at the middle section of the second jamb 102b between the bottom end 119 and the top end 121 without the back plate 156 present on the edge beam 106. FIG. 4D illustrates an enlarged view of the edge beam 106 mechanically coupled to the third striker 136 present at the top end 121 of the second jamb 102b without the back plate 156 present on the edge beam 106.

Figure 5A:
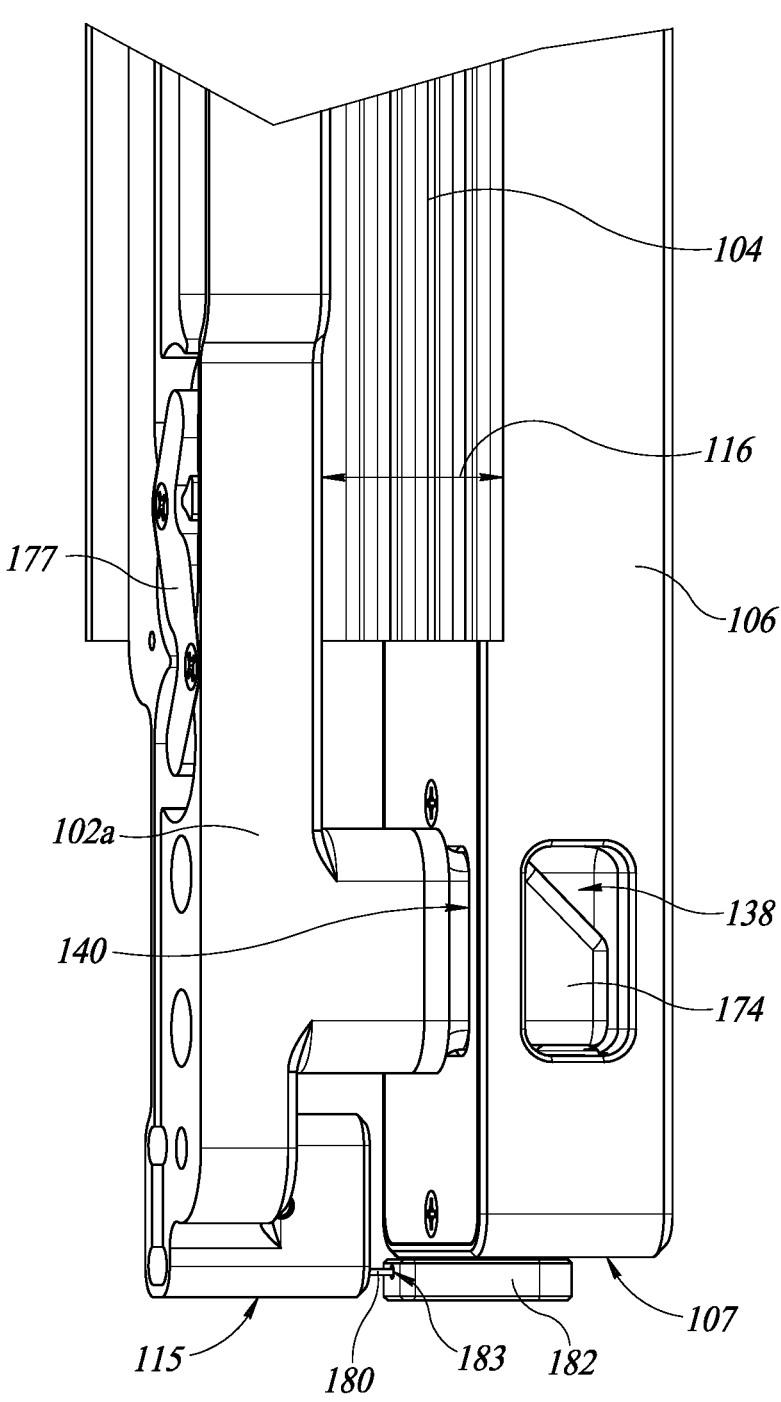
FIG. 5A illustrates an enlarged view of the bottom end section of the embodiment of the edge beam interlocked with and received by an embodiment of a respective jamb of the present disclosure.

FIG. 5A illustrates an enlarged view of the bottom end 115 of the first jamb 102a and the bottom end 107 of the edge beam 106 when the foldable barrier 104 is in the stowed position. While not visible, when the foldable barrier 104 is in the stowed position the latch 166 interlocks with a fourth striker 174. For example, the latch 166 interlocks with a notch of the fourth striker 174. The fourth striker 174 may be the same or similar to the first striker 130. For example, the notch of the fourth striker 174 may be the same or similar to the notch 164 of the first striker 130. The latch 166 may interlock with the notch of the fourth striker 174 in the same or similar manner as discussed earlier with respect to the latch 166 interlocking with the notch 164 of the first striker 130.

As may be readily seen in FIG. 5A, the second opening 140 in the edge beam 106 receives the fourth striker 174. For example, the fourth striker 174 extends into the second opening 140, and the fourth striker 174 is inserted into the second opening 140. Enough clearance between respective surfaces of the edge beam 106 delimiting the second opening 140 is provided such that the fourth striker 174 is smoothly and easily inserted into the second opening 140 without excessive contact or rubbing between the respective surfaces and the fourth striker 174.

Figure 5B:
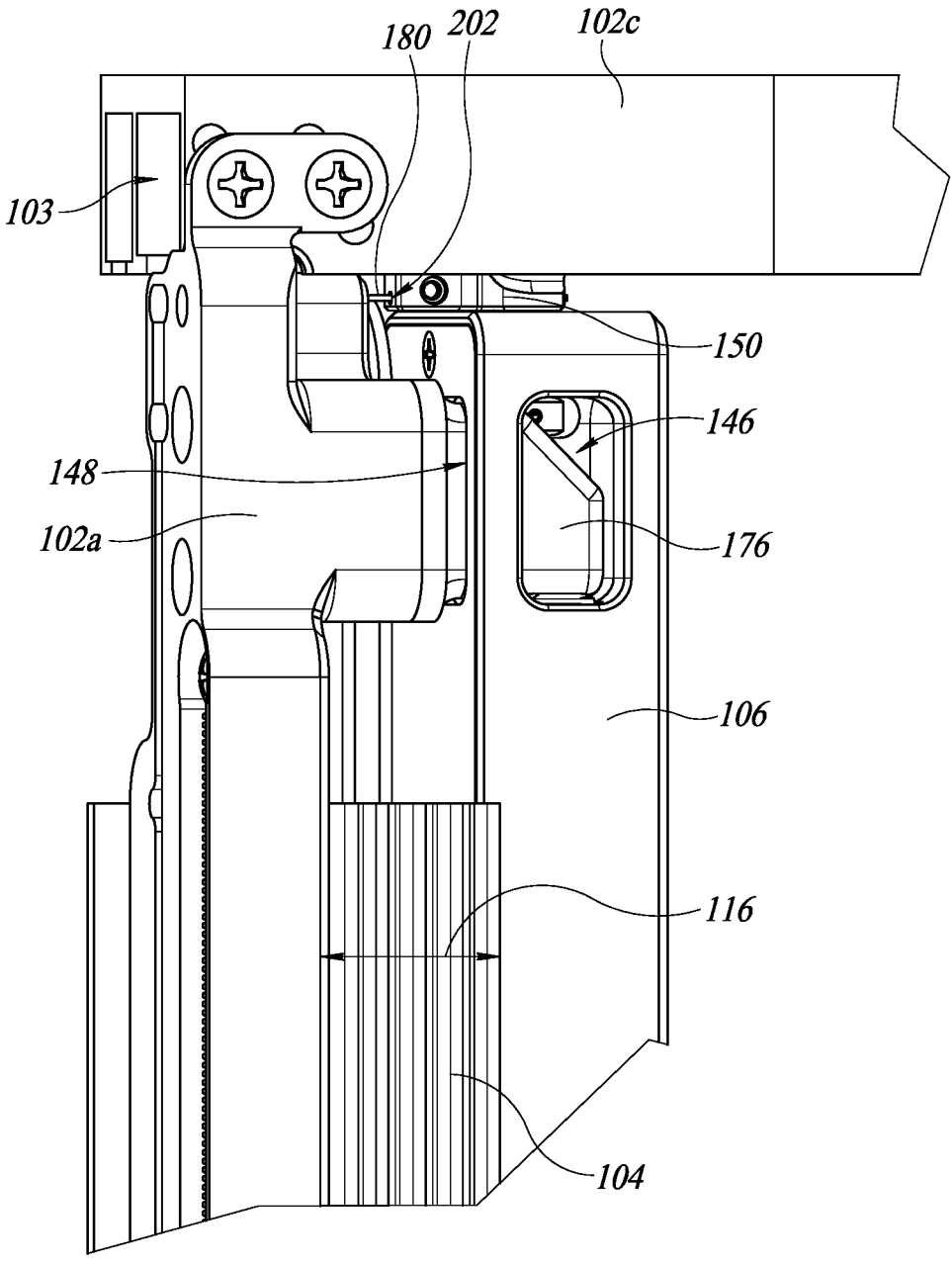
FIG. 5B illustrates an enlarged view of the top end section of the embodiment of the edge beam interlocked with and received by an embodiment of the respective jamb of the present disclosure as shown in FIG. 5A.

FIG. 5B illustrates an enlarged view of the top end 117 of the first jamb 102a and the top end 109 of the edge beam 106 when the foldable barrier 104 is in the stowed position. While not visible, when the foldable barrier 104 is in the stowed position a latch interlocks with a fifth striker 176. For example, the latch interlocks with a notch of the fifth striker 176. The fifth striker 176 may be the same or similar to the first striker 130. For example, the notch of the fifth striker 176 may be the same or similar to the notch 164 of the first striker 130. The latch that interlocks with the notch of the fifth striker 176 may be the same latch that interlocks with a notch of the third striker 136 when the foldable barrier 104 is in the expanded position.

As may be readily seen in FIG. 5B, the fifth opening 148 in the edge beam 106 receives the fifth striker 176. For example, the fifth striker 176 extends into the fifth opening 148, and the fifth striker 176 is inserted into the fifth opening 148. Enough clearance between respective surfaces of the edge beam 106 delimiting the fifth opening 148 is provided such that the fifth striker 176 is smoothly and easily inserted into the fifth opening 176 without excessive contact or rubbing between the respective surfaces and the fifth striker 176.

Figure 6A:
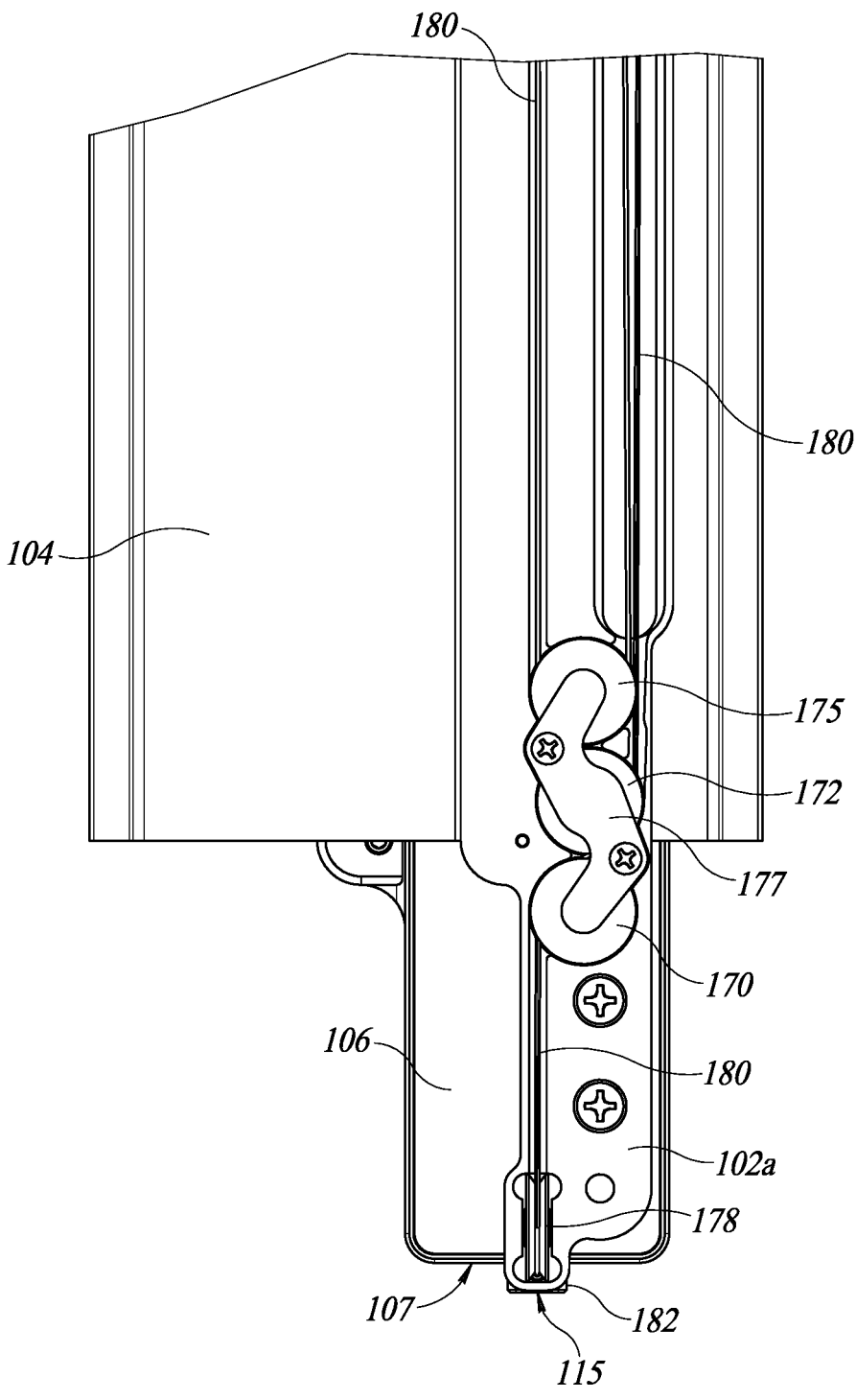
FIG. 6A illustrates an enlarged view of an embodiment of a pulley system present at a bottom end section of a respective jamb of the present disclosure.

FIG. 6A illustrates an enlarged side view of the bottom end 115 of the first jamb 102a at which a first pulley 170, a second pulley 172, and a third pulley 175 are present. The first, second, and third pulleys are mechanically coupled together by a fastening component 177. The fastening component 177 fastens the first, second, and third pulleys 170, 172, 175, respectively, in a stationary position such that the first, second, and third pulleys 170, 172, 175 rotate (e.g., clockwise and counterclockwise) about centers of the first, second, and third pulleys 170, 172, 175, respectively.

A fourth pulley 178 is present at the bottom end 115 of the first jamb 102a and a cable 180 is in mechanical cooperation with the first, second, third, and fourth pulleys 170, 172, 175, 178, respectively. Similar to the first, second, and third pulleys 170, 172, 175, the fourth pulley 178 is held in a stationary position and rotates (e.g., clockwise and counterclockwise) about a center of the fourth pulley 178. The cable 180 is in mechanical cooperation with the first, second, third, and fourth pulleys 170, 172, 175, 178 such that as the cable 180 moves the pulleys rotate in a counterclockwise or clockwise direction depending on a direction of the movement of the cable 180. For example, the cable 180 may be inset within respective grooves of the first, second, third, and fourth pulleys 170, 172, 175, 178, respectively. The cable 180 extends downward to the bottom end 115 of the first jamb 102a and extends upward to the top end 117 of the first jamb 102a, which may be readily seen in FIG. 6C.

The cable 180 is in mechanical cooperation with the bottom end 107 of the edge beam 106 by a cable coupling component 182 to which a first cable end 183 of the cable 180 is mechanically coupled, which may be more readily seen in FIG. 5A. The cable coupling component 182 moves along with the edge beam 106 when the foldable barrier 104 is moved from the stowed position to the expanded position and vice versa.

Figure 6B:
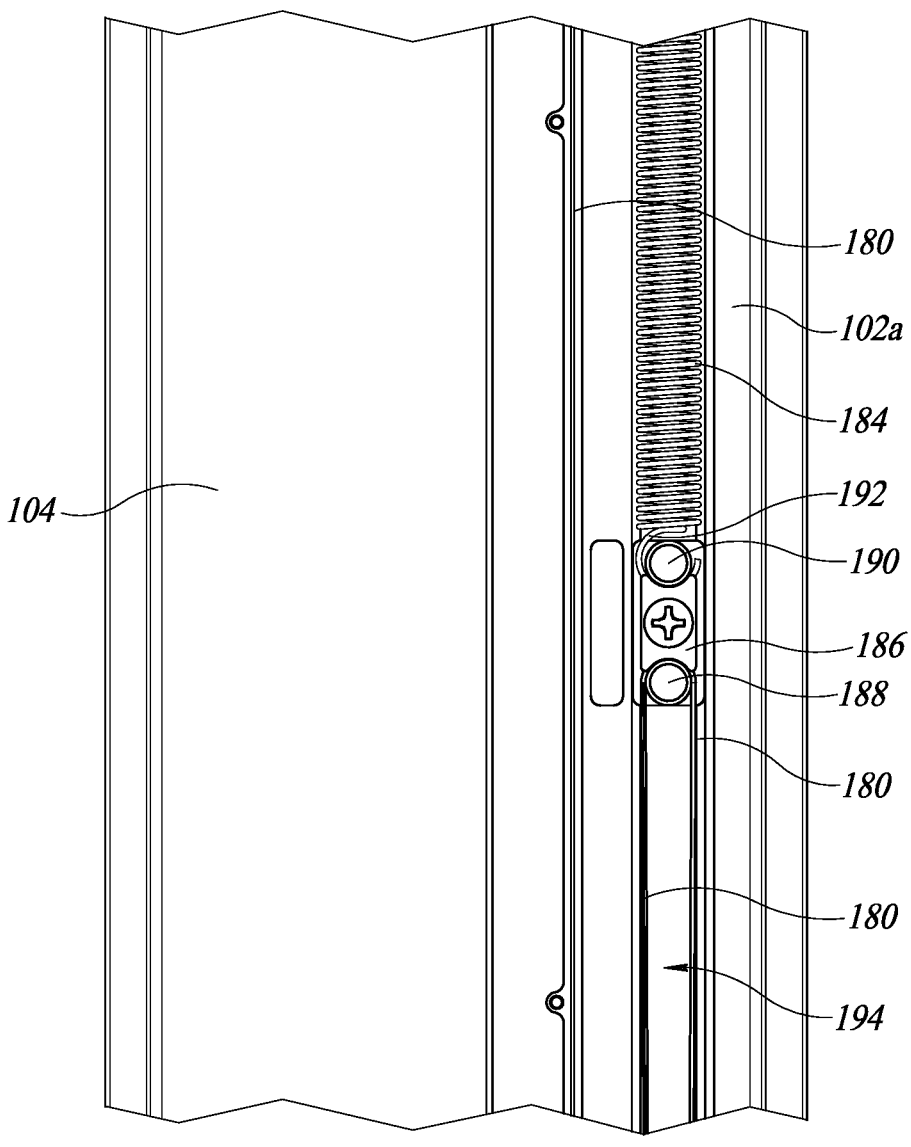
FIG. 6B illustrates an enlarged view of the embodiment of the pulley system present at a middle section of the respective jamb of the present disclosure as shown in FIG. 6A.

FIG. 6B illustrates an enlarged side view of a middle section of the first jamb 102a at which an extension spring 184 is in mechanical cooperation with the cable 180. The extension spring 184 and the cable 180 are in mechanical cooperation with each other through a slide component 186 to which the extension spring 184 and the cable 180 are mechanically coupled. The slide component 186 includes a first protrusion 188 and a second protrusion 190. The cable 180 wraps around or partially wraps around the first protrusion 188, and a first hook 192 of the extension spring 184 at least partially wraps around the second protrusion 190. The slide component 186 moves up and down along a second track 194 in the first jamb 102a.

The cable 180 is mechanically coupled to the slide component 186 such that the cable 180 does not slide along the first protrusion 188. For example, the slide component 186 clamps onto the cable 180 such that the cable 180 may not slide along, out of, or through the slide component 186. In other words, the cable 180 is stationary or fixed with respect to the slide component 186 such that the cable 180 moves with the slide component 186 but does not slide along, out of, or through the slide component 186. As shown in this embodiment, the slide component 186 clamps down on or fixedly holds a portion of the cable 180 extending along or through the slide component 186 such that the cable 180 moves along with the slide component 186.

In some alternative embodiments, the cable 180 may be replaced by a first cable on the left-hand side of the slide component 186 and a second cable on the right-hand side of the slide component. A respective end of the first cable is mechanically coupled to the roller component 150 at the top end 109 of the edge beam 106, and the first cable partially wraps around the third pulley 175 and a fifth pulley 200, which may more readily be seen in FIG. 6C. A respective end of the second cable is coupled to the cable coupling component 182 at the bottom end 107 of the edge beam 106, and partially wraps around first, second, and fourth pulleys 170, 172, 178. Respective ends of the first and second cable are mechanically coupled to the slide component 186 such that the first and second cables do not slide along the slide component 186. For example, the respective ends of the first and second cables may be tied down to the slide component 186 such that the first and second cables may not slide along, out of, or through the slide component 186. In other words, the respective ends of the first and second cables are stationary or fixed with respect to the slide component such that the first and second cables move with the slide component 186 but do not slide along out of, or through the slide component 186. As in some alternative embodiments, the respective ends of the first and second cables, which are separate and distinct from each other, have respective ends clamped down, held down, or tied to the slide component such that the respective ends of the first and second components are stationary relative to the slide component 186 such that the respective ends move along with the slide component 186.

Figure 6C:
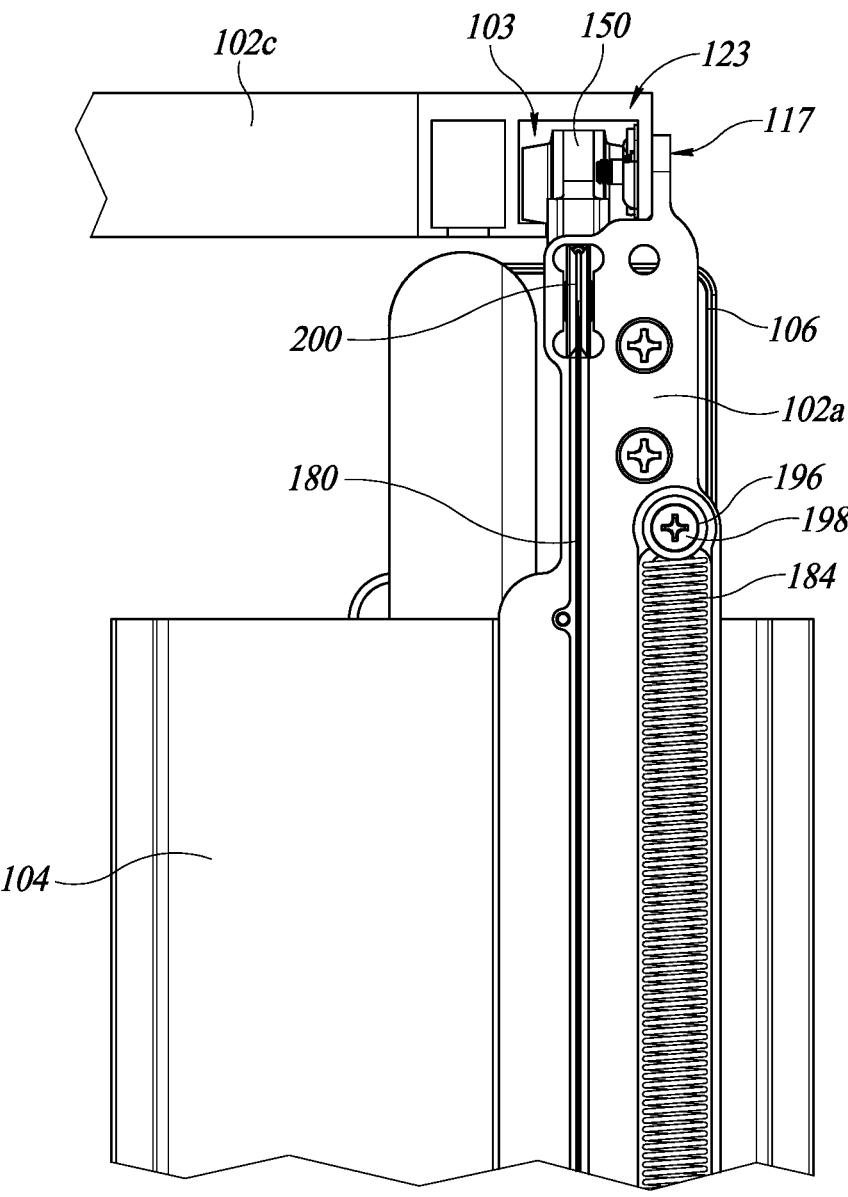
FIG. 6C illustrates an enlarged view of the embodiment of the pulley system present at a top end section of the respective jamb of the present disclosure as shown in FIGS. 6A and 6B.

FIG. 6C illustrates an enlarged side view of the top end 117 of the first jamb 102a at which a hoop 196 of the extension spring 184 is present. The hoop 196 is mechanically coupled to the first jamb by a fastener 198, which may be a screw. In an alternative embodiment, the hoop 196 may instead be a hook the same or similar to the hook 192, which is at an end of the extension spring 184 present at the middle section of the first jamb 102a opposite to an end of the extension spring 184 present at the top end 117 of the first jamb 102*a*. The fastener 198 holds the hoop 196 of the extension spring 184 in a fixed, stationary position.

The fifth pulley 200 is present at the top end 117 of the first jamb 102*a*. The cable 180 is in mechanical cooperation with the fifth pulley 200 such that the cable 180 partially wraps around the fifth pulley 200. For example, the cable 180 may be inset within a respective groove of the fifth pulley 200.

The cable 180 is in mechanical cooperation with the fifth pulley 200 in the same or similar manner as discussed earlier with respect to the cable 180 being in mechanical coopera- tion with the first, second, third, and fourth pulleys 170, 172, 175, 178. For example, the cable 180 is inset within a respective groove of the fifth pulley 200 such that as the cable 180 moves the fifth pulley rotates in a counterclock- wise or clockwise direction depending on the direction of the movement of the cable 180.

As may readily be seen in FIG. 5B, a second cable end 202 of the cable 180 is mechanically coupled to the roller component 150, which is received by the first track 103 in the header 102*c*. The roller component 150 moves along the first track 103 directing the edge beam 106 along the track 103 in the header 102*c* when moving the foldable barrier 104 from the expanded position to the stowed position and vice versa.

When the foldable barrier 104 is in the expanded position, the cable 180 is fully extended such that the cable 180 is extending from the first jamb 102*a* to the top end and the bottom end of the edge beam 106, which is at the second jamb 102*b*. When the foldable barrier 104 is in the stowed position, the cable 180 is fully retracted by the extension spring 184.

As readily seen in FIG. 1A, the header 102*c* has a curved shape, which may be a serpentine-like shape, an S-like shape, or some other curved shape. In alternative embodi- ments, the header may have an L-like shape, a C-like shape, a straight line-like shape, or some other type of shape. In other words, the header 102*c* may have any shape such that the foldable barrier 104 blocks off or limits access to a flight deck of an aircraft or some other area of the aircraft to which a passenger does not have permission, certification, or approval to access.

The foldable barrier 104 may be structured such that a profile or shape of the foldable barrier 104 will readily block off or limit access to a flight deck of an aircraft or some other area of the aircraft to which a passenger does not have permission, certification, or approval to access. For example, as the header 102*c* as shown in FIG. 1A has a serpentine-like shape, the foldable barrier 104 may have a serpentine-like shape as well when in the expanded position. Alternatively, when the header 102*c* has an L-like shape, the foldable barrier 104 may have an L-like shape as well when in the expanded position.

The roller component 150, the respective pulleys 170, 172, 175, 178, 200, the cable 180, the extension spring 184, and the slide component 186 mechanically cooperate with each other to evenly distribute a force applied to the edge beam 106 across the edge beam 106. These components together may be referred to as a pulley system. The func- tionality of the roller component 150, the respective pulleys 170, 172, 175, 178, 200, the cable 180, the extension spring 184, and the slide component 186 as shown in FIGS. 6A-6C to evenly distribute a force applied to the edge beam 106 across the edge beam 106 will be discussed in further detail with respect to FIGS. 7A and 7B as follows within the present disclosure.

Figure 7A:
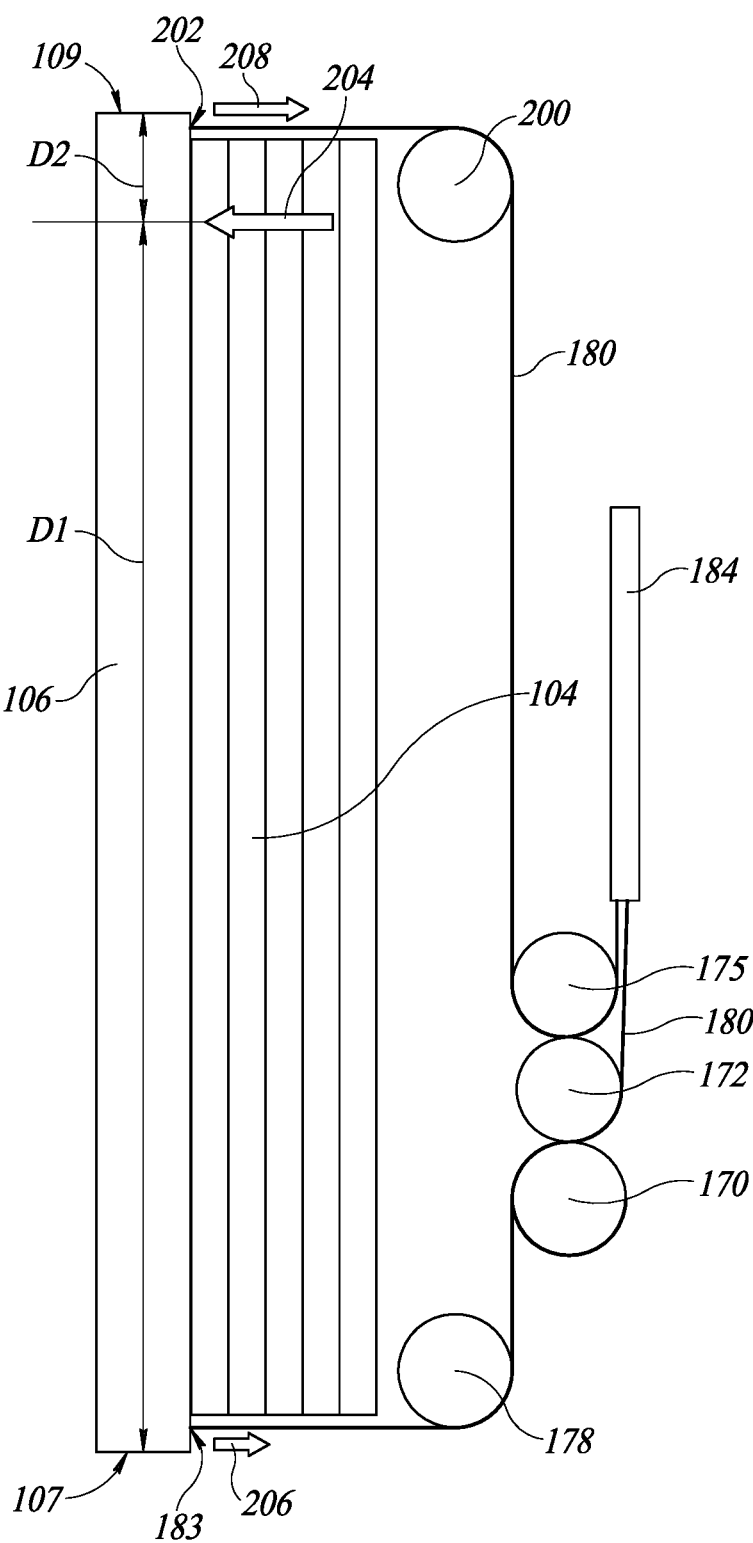
FIG. 7A is a schematic diagram representative of a load applied to the embodiment of the edge beam when moving the foldable barrier towards an expanded position.

FIG. 7A is directed to a simplified force diagram of the flight deck barrier 100 as described in detail in the present disclosure representing the edge beam 106 when the fold- able barrier 104 is being moved from the stowed position to the expanded position. In other words, the edge beam 106 is being moved away from the first jamb 102*a* towards the second jamb 102*b* such that the foldable barrier 104 is being moved towards the expanded position.

A load 204 is applied to a location along the edge beam 106 offset from a center of the edge beam 106 when moving the foldable barrier 104 towards the expanded position. As shown in FIG. 7A, the location of the load 204 applied to the edge beam 106 is closer to the top end 109 of the edge beam 106 than the bottom end 107 of the edge beam 106. The load 204 is evenly distributed between the bottom end 107 and the top end 109 of the edge beam 106 by the roller component 150, the respective pulleys 170, 172, 175, 178, 200, the cable 180, the extension spring 184, and the slide component 186. For example, a first force 206 is applied to the bottom end 107 of the edge beam 106 and a second force 208 is applied to the top end 109 of the edge beam 106 such that the load 204 is evenly distributed across the edge beam 106. The even distribution of the load 204 across the edge beam 106 results in a vertical orientation of the edge beam 106 being maintained as the foldable barrier 104 is moved towards the expanded position.

As readily seen in FIG. 7A, the first force 206 is less than second force 208. The first force and the second force are inversely proportional to respective distances the location is from the top and bottom ends 107, 109 of the cable 180, respectively. For example, the first force 206 is inversely proportional (e.g., 1/D1) to a first distance D1 the load 204 is applied from the bottom end 107 of the edge beam 106, and the second force 208 is inversely proportional (e.g., 1/D2) to a second distance D2 from the top end 109 of the edge beam. The first and second forces 206, 208 oppose a torque applied to the edge beam 106 due to the load being applied at the location offset from the center of the edge beam 106 to avoid the edge beam 106 rotating in a coun- terclockwise direction based on the orientation as shown in FIG. 7A. The first and second forces 206, 208 opposing this torque result in the edge beam 106 remaining in a substan- tially vertical orientation. The first force and the second force 206, 208, respectively, are inversely proportional to the first and second distances D1, D2, respectively, by the cable 180 being in mechanical cooperation with the respective pulleys 170, 172, 175, 178, 200, the slider component 186, and the extension spring, the details of which will be discussed as follows. The first and second forces 206, 208 are directed in a direction opposite to the load 204.

As shown in FIG. 7A, the load 204 is applied to the location along the edge beam 106 offset from the center of the edge beam 106. The load 204 being applied at the location offset from the center of the edge beam 106 results in the first and second cable ends 183, 202 of the cable 180 partially opposing the load 204 to reduce the effect of the torque due to the load being applied to the location offset from the center of the edge beam. When the load 204 is applied in this manner to the edge beam 106, the cable 180 may slide along the first, second, third, fourth, and fifth pulleys 170, 172, 175, 178, 200 causing the respective pulleys 170, 172, 175, 178, 200 to rotate in response. The cable 180 pulls downward on the sliding component 186, and the sliding component 186 moves towards the bottom end 115 of the first jamb 102*a* along the second track 194. As the sliding component 186 moves downward along the second track 194 towards the bottom end 115 of the first jamb 102*a*, the sliding component 186 pulls on the hook 192 of the extension spring 184, which results in the extension spring 184 increasing in length (e.g., extending) from an equilibrium position (e.g., length of the extension spring 184 when no load is applied to the edge beam 106) of the extension spring 184. The extension of the extension spring 184 results in the extension spring 184 distributing the load 204 evenly across the edge beam 106 through the mechanical cooperation between the extension spring 184, the sliding component 186, the respective pulleys, 170, 172, 175, 178, 200, and the cable 180 such that the edge beam 106 does not rotate in a counterclockwise direction due to torque caused by the load 204 being applied to the location along the edge beam 106 offset from the center of the edge beam 106.

In other words, a first portion of the cable 180 (e.g., portion mechanically coupled to the roller component 150) on the left-hand side of the sliding component 186 as shown in FIG. 6B is taut or tight, and a second portion of the cable 180 (e.g., portion mechanically coupled to the cable coupling component 182) is slack relative to the first portion of the cable. The tightness of the first portion of the cable 180 and the slackness of the second portion of the cable 180 results in the edge beam 106 remaining in the vertical orientation when the foldable barrier 104 is being moved from the stowed position to the expanded position.

While the above discussion with respect to FIG. 7A applies to the load 204 being applied at the location above the center of the edge beam 106 as shown in FIG. 7A that results in a counterclockwise torque being applied to the edge beam, it will be readily appreciated that the mechanical cooperation of the extension spring 184, the sliding component 186, the respective pulleys, 170, 172, 175, 178, 200, and the cable 180 would evenly distribute a load applied to the edge beam 106 at a location below the center of the edge beam 106. When the load is applied to the location of the edge beam 106 below the center of the edge beam 106, the load applied to the edge beam results in a clockwise torque being applied to the edge beam 106.

While the above discussion with respect to FIG. 7A applies to the load 204 being applied in a first direction directed from the first jamb 102*a* towards the second jamb 102*b* when moving the foldable barrier from the stowed position to the expanded position, it will be readily appreciated that the mechanical cooperation of the extension spring 184, the sliding component 186, the respective pulleys, 170, 172, 175, 178, 200, and the cable 180 would evenly distribute a load applied in a second direction directed from the second jamb 102*b* to the first jamb 102*a* when moving the foldable barrier 104 from the expanded position to the stowed position.

Figure 7B:
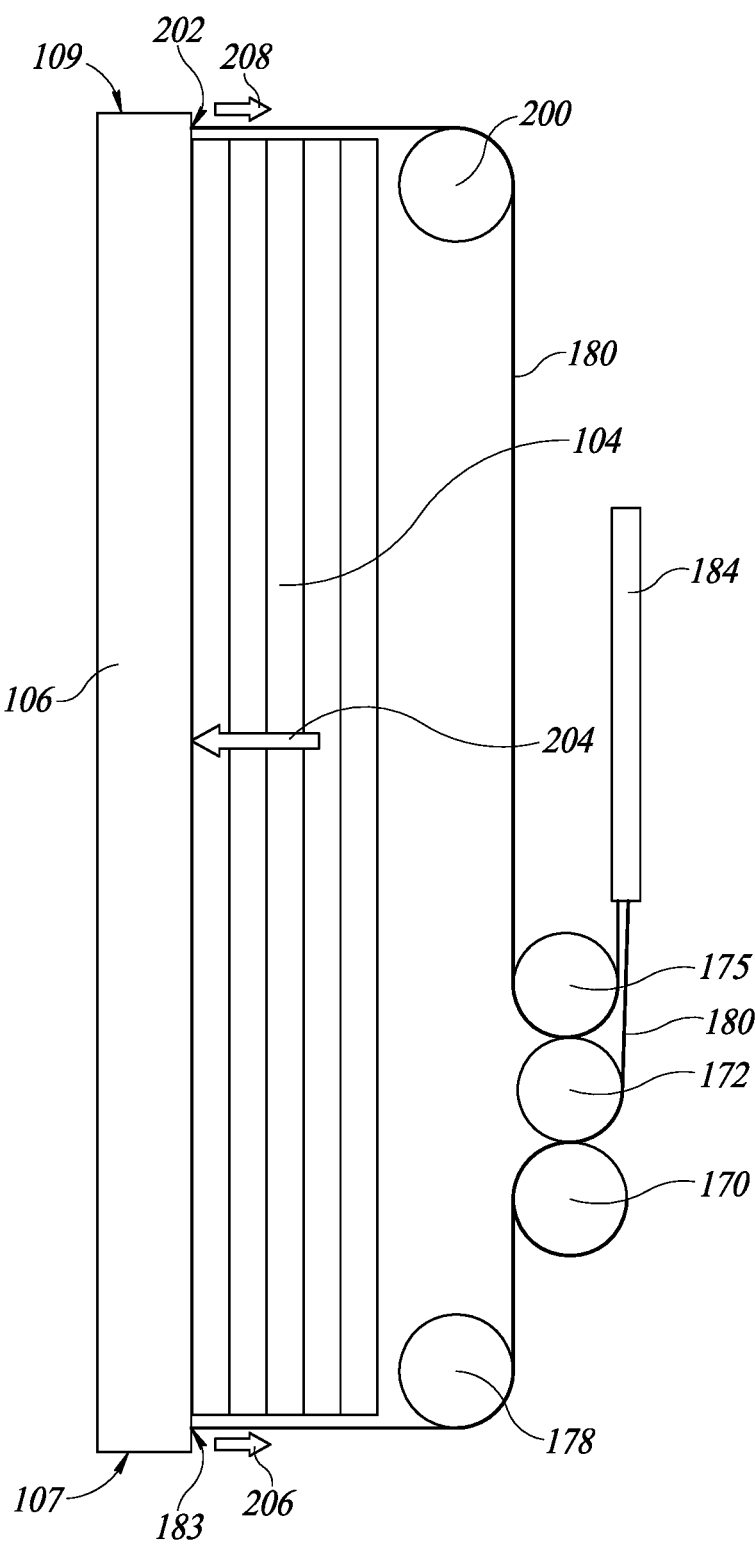
FIG. 7B is a schematic diagram representative of a load applied to the embodiment of the edge beam when moving the foldable barrier towards an expanded position

FIG. 7B is directed to a simplified force diagram of the flight deck barrier 100 as described in detail in the present disclosure representing the edge beam 106 when the foldable barrier 104 is being moved from the stowed position to the expanded position. In other words, the edge beam 106 being moved away from the first jamb 102*a* towards the second jamb 102*b* such that the foldable barrier 104 is being moved towards the expanded position. Unlike FIG. 7A, as shown in FIG. 7B, the load 204 is applied to the center of the edge beam 106.

The load 204 is applied to the center of the edge beam 106 when moving the foldable barrier 104 towards the expanded position. The load 204 is evenly distributed between the bottom end 107 and the top end 109 of the edge beam 106 by the roller component 150, the respective pulleys 170, 172, 175, 178, 200, the cable 180, the extension spring 184, and the slide component 186 in the same or similar manner as discussed above with respect to FIG. 7A. However, unlike FIG. 7A in which the first force 206 is less than the second force 208, as shown in FIG. 7B, the first force 206 is substantially equal to or equal to the second force 208. The first and second forces 206, 208 are substantially equal to each other as the load 204 is applied to the center of the edge beam such that the load 204 does not cause any torque (e.g., counterclockwise or clockwise) being applied to the edge beam 106.

As shown in FIG. 7B, the first force 206 is applied to the bottom end 107 of the edge beam 106 and the second force 208 is applied to the top end 109 of the edge beam 106 by the first and second cable ends 183, 202, respectively, which results in the load 204 being evenly distributed across the edge beam 106. The even distribution of the load 204 across the edge beam 106 results in the vertical orientation of the edge beam 106 being maintained as the foldable barrier 104 is moved towards the expanded position.

While the above discussion with respect to FIG. 7B applies to the load 204 being applied in a first direction directed from the first jamb 102*a* towards the second jamb 102*b* when moving the foldable barrier from the stowed position to the expanded position, it will be readily appreciated that the mechanical cooperation of the extension spring 184, the sliding component 186, the respective pulleys, 170, 172, 175, 178, 200, and the cable 180 would evenly distribute a load applied in a second direction directed from the second jamb 102*b* to the first jamb 102*a* when moving the foldable barrier 104 from the expanded position to the stowed position.

In view of the above discussion of the even distribution of the respective loads 204 applied to the edge beam 106 as shown in FIGS. 7A and 7B, the vertical orientation of the edge beam 106 is maintained as the edge beam 106 is moved towards the expanded position or moved towards the stowed position. By maintaining the vertical orientation of the edge beam 106 while moving the edge beam 106 between the expanded position and the stowed position or vice versa, the likelihood of the edge beam 106 interlocking with the respective strikers 130, 134, 136 along the second jamb 102*b* or interlocking with the respective strikers 174, 176 along the first jamb 102*a* is increased when moving the foldable barrier 104 to the expanded position or to the stowed position, respectively. In other words, the likelihood of the edge beam 106 only partially or not interlocking with the respective strikers 130, 134, 136 along the second jamb 102*b* or partially or not interlocking with the respective strikers 174, 176 at the first jamb 102*a* when moving the foldable barrier 104 to the expanded position or the stowed position, respectively, is reduced.

A device may be summarized as including a frame having a first side and a second side opposite to the first side, the frame including a first jamb at the first side, a second jamb at the second side, and a header at top ends of the first jamb and the second jamb, the header extends from the top end of the first jamb to the top end of the second jamb, the header including a track; a foldable barrier having a third side mechanically coupled to the second jamb, a fourth side opposite to the third side, the foldable barrier including a stowed position, and an expanded position; an edge beam mechanically coupled to the fourth side, the edge beam having a top end and a bottom end opposite to the top end, the edge beam having a wheel at the top end in mechanical cooperation with the track; and a pulley system configured to distribute a load applied to the edge beam at a location along the edge beam offset from a center of the edge beam between the top end and bottom end of the edge beam inversely proportional to distances the location is from the top end and bottom end of the edge beam.

The pulley system may include a first pulley adjacent at the second end and in the second jamb; a second pulley at the third end and in the second jamb; a third, fourth, and fifth pulley mechanically in the second jamb and between the second and third end, the third pulley closer to the second end than the fourth and fifth pulley, the fourth pulley between the third pulley and the fifth pulley, and the fifth pulley closer to the third end than the third and fourth pulleys; an extension spring in the second jamb between the third pulley and the first pulley; and a cable mechanically coupled to the first pulley and the second pulley.

The cable may be mechanically coupled to the top end of the edge beam and may be mechanically coupled to the bottom end of the edge beam.

The pulley system may be configured to evenly distribute a load applied to the edge beam at a location along the edge beam offset from a center of the edge beam.

The first jamb may include a bottom end opposite to the top end of the first jamb, a first striker at the top end of the first jamb, a second striker at a bottom end of the first jamb, and a third striker at a location between the first top end and the bottom end of the first jamb; and the edge beam is in mechanical cooperation with the first striker, the second striker, and the third striker when the foldable barrier is in the expanded position.

The edge beam may include a combination lock in mechanical cooperation with respective ones of a plurality of catches within the edge beam, the plurality of catches configured to mechanically cooperate with the first striker, the second striker, and the third striker when the foldable barrier is in the expanded position; and the combination lock, the plurality of catches, the first striker, the second striker, and the third striker configured to lock the edge beam in place when the foldable barrier is in the expanded position.

The edge beam may further include a push down handle in mechanical cooperation with the combination lock.

The second jamb may include a first striker at the top end of the second jamb, and a second striker at the bottom end of the second jamb; and respective ones of a plurality of catches of the edge beam may be in mechanical cooperation with the first striker and second striker when the foldable barrier is in the stowed position.

The edge beam may include a combination lock in mechanical cooperation with the respective ones of the plurality of catches; and the combination lock, the first striker, the second striker, and the respective ones of the plurality of catches may be configured to lock the edge beam in place when the foldable barrier is in the stowed position.

The edge beam may further include a push down handle in mechanical cooperation with the combination lock.

The header may be curved.

The edge beam may include a wheel at the top end of the edge beam in mechanical cooperation with the track of the header, the wheel is configured to slidably travel along the track of the header.

A device may be summarized as including a frame having a header including a track; a foldable barrier including a stowed position, and an expanded position; an edge beam mechanically coupled to foldable barrier and in mechanical cooperation with the track; and a pulley system configured to distribute a load applied to the edge beam at a location along the edge beam offset from a center of the edge beam between the top end and bottom end of the edge beam inversely proportional to distances the location is from the top end and bottom end of the edge beam.

The frame may further include a first side; a second side opposite to the first side; a first jamb at the first side, the first jamb including a top end and a bottom end opposite to the top end, and a first striker at the top end and a second striker at the bottom end, the first and second strikers are in mechanical cooperation with the edge beam when the foldable barrier is in the stowed position; and a second jamb at the second side, the second jamb including a top end and a bottom end opposite to the top end, and a third striker at the top end, a fourth striker at the bottom end, and a fifth striker between the top end and the bottom end, the first, second and third strikers are in mechanical cooperation with the edge beam when the foldable barrier is in the expanded position.

The header may be curved.

The edge beam may further include a top end and a wheel at the top end in mechanical cooperation with the track of the header.

The frame may include a first jamb; and the foldable barrier, the first jamb, and the edge beam may have a dimension extending from a first surface of the edge beam facing away from the first jamb to a second surface of first jamb facing away from the first surface of the edge beam that is substantially equal to or less than 2.5-inches.

A device may be summarized as including a frame including a first jamb, including a top end and a bottom end opposite to the top end, a first striker at the top end, a second striker at the bottom end, and a third striker between the top end and the bottom end; and a second jamb opposite to the first jamb, the second jamb including a top end and a bottom end opposite to the top end, a fourth striker at the top end, and a fifth striker at the bottom end; a foldable barrier including a first end mechanically coupled to the second jamb, and a second end opposite to the first end; and an edge beam mechanically coupled to the second end of the foldable barrier.

The foldable barrier may include a stowed position and an expanded position; and the edge beam may include a plurality of catches, respective ones of the plurality of catches interlock with the first, the second, and the third strikers when the foldable barrier is in the expanded position, and respective ones of the plurality of catches interlock with the fourth and the fifth strikers when the foldable barrier is in the stowed position.

The edge beam my further include a combination lock; and the combination lock in mechanical cooperation with the plurality of catches, the combination lock configured to lock and unlock respective ones of the plurality of catches with the first, second, and third strikers when the foldable barrier is in the expanded position, and the combination lock configured to lock and unlock respective ones of the plurality of catches when the fourth and fifth strikers when the foldable barrier is in the stowed position.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a frame having a first side and a second side opposite to the first side, the frame including:
a first jamb at the first side, the first jamb includes:
a top first jamb striker at the top end of the first jamb; and
a bottom first jamb striker at the bottom end of the first jamb;
a second jamb at the second side, the second jamb includes:
a bottom end opposite to the top end of the second jamb;
a top second jamb striker at the top end of the second jamb;
a bottom second jamb striker at a bottom end of the second jamb; and
an intermediate second jamb striker at a location between the top end of the second jamb and the bottom end of the second jamb; and
a header at top ends of the first jamb and the second jamb, the header extends from the top end of the first jamb to the top end of the second jamb, the header including a track;
a foldable barrier having a third side mechanically coupled to the first jamb, a fourth side opposite to the third side, the foldable barrier including:
a stowed position; and
an expanded position;
an edge beam mechanically coupled to the fourth side, the edge beam having a top end and a bottom end opposite to the top end, the edge beam having a wheel at the top end in mechanical cooperation with the track; and
a pulley system configured to distribute a load applied to the edge beam at a location along the edge beam offset from a center of the edge beam between the top end and bottom end of the edge beam inversely proportional to distances the location is from the top end and bottom end of the edge beam,
wherein the edge beam is in mechanical cooperation with the top second jamb striker, the bottom second jamb striker, and the intermediate second jamb striker when the foldable barrier is in the expanded position, and
wherein respective ones of a plurality of catches of the edge beam are in mechanical cooperation with the top first jamb striker and bottom first jamb striker when the foldable barrier is in the stowed position.

2. The device of claim 1, wherein the pulley system includes:
a first, second, and third pulley positioned in the first jamb and between a bottom end of the first jamb and the top end of the first jamb, the first pulley closer to the bottom end of the first jamb than the second and third pulleys, the second pulley between the first pulley and the third pulley, and the third pulley closer to the top end of the first jamb than the first and second pulleys;
a fourth pulley at the bottom end of the first jamb;
a fifth pulley at the top end of the first jamb;
an extension spring in the first jamb between the first pulley and the fourth pulley; and
a cable mechanically coupled to the fourth pulley and the fifth pulley.

3. The device of claim 2, wherein the cable is mechanically coupled to the top end of the edge beam and is mechanically coupled to the bottom end of the edge beam.

4. The device of claim 1, wherein the pulley system is configured to evenly distribute a load applied to the edge beam at a location along the edge beam offset from a center of the edge beam.

5. The device of claim 1, wherein:
the edge beam includes a combination lock in mechanical cooperation with respective ones of a plurality of catches within the edge beam, the plurality of catches configured to mechanically cooperate with the top second jamb striker, the bottom second jamb striker, and the intermediate second jamb striker when the foldable barrier is in the expanded position; and
the combination lock, the plurality of catches, the top second jamb striker, the bottom second jamb striker, and the intermediate second jamb striker configured to lock the edge beam in place when the foldable barrier is in the expanded position.

6. The device of claim 5, wherein the edge beam further includes a push down handle in mechanical cooperation with the combination lock.

7. The device of claim 1, wherein:
the edge beam includes a combination lock in mechanical cooperation with the respective ones of the plurality of catches; and
the combination lock, the top first jamb striker, the bottom first jamb striker, and the respective ones of the plurality of catches configured to lock the edge beam in place when the foldable barrier is in the stowed position.

8. The device of claim 7, wherein the edge beam further includes a push down handle in mechanical cooperation with the combination lock.

9. The device of claim 1, wherein the header is curved.

10. The device of claim 1, wherein the wheel of the edge beam is configured to slidably travel along the track of the header.

11. A device, comprising:
a frame having a header, the frame including:
a first side;
a second side opposite to the first side;
a first jamb at the first side, the first jamb including:
a top end and a bottom end opposite to the top end; and
a top first jamb striker at the top end of the first jamb and a bottom first jamb striker at the bottom end of the first jamb;
a second jamb at the second side, the second jamb including:
a top end and a bottom end opposite to the top end; and
a top second jamb striker at the top end of the second jamb, a bottom second jamb striker at the bottom end of the second jamb, and an intermediate second jamb striker between the top end of the second jamb and the bottom end of the second jamb;
a foldable barrier including:
a stowed position; and
an expanded position;
an edge beam mechanically coupled to foldable barrier and in mechanical cooperation with a track of the header; and
a pulley system configured to distribute a load applied to the edge beam at a location along the edge beam offset from a center of the edge beam between a top end of the edge beam and a bottom end of the edge beam inversely proportional to distances the location is from the top end of the edge beam and bottom end of the edge beam, wherein the top first jamb striker and the bottom first jamb striker are in mechanical cooperation with the edge beam when the foldable barrier is in the stowed position, and wherein the top second jamb striker, the bottom second jamb striker, and the intermediate second jamb striker are in mechanical cooperation with the edge beam when the foldable barrier is in the expanded position.

12. The device of claim 11, wherein the header is curved.

13. The device of claim 11, wherein the edge beam further includes a wheel at the top end of the edge beam in mechanical cooperation with the track of the header.

14. A flight deck barrier apparatus of an aircraft having an aisle, comprising:

a frame having a first side and a second side opposite to the first side, the frame including:

a first jamb at the first side and coupled to a structure of the aircraft, the first jamb including one or more first jamb strikers;

a second jamb at the second side and coupled to the structure of the aircraft, the second jamb including one or more second jamb strikers and one or more notches; and a header at top ends of the first jamb and the second jamb and coupled to the structure of the aircraft, the header extending from the top end of the first jamb to the top end of the second jamb, wherein the first jamb, the second jamb, and the header delimit the aisle of the aircraft;

a foldable barrier including reinforced materials sized and shaped to resist breakage of the foldable barrier to restrict access to a flight deck of the aircraft, the foldable barrier further including a plurality of folds in an accordion structure, such that the plurality of folds are configured to fold up when the foldable barrier is in a stowed position and are configured to extend when the foldable barrier is in an expanded position;

an edge beam mechanically coupled to the foldable barrier, the edge beam including:

a handle including an opening sized and shaped to enable gripping of the foldable barrier to move the foldable barrier between the stowed and expanded positions;

a lock configured to lock the foldable barrier when the foldable barrier is in the expanded position such that access to the flight deck is restricted;

a latch that is moveable between a first position and second position, the latch configured to engage the one or more notches of the second jamb when the foldable barrier is in the expanded position and to disengage the one or more notches of the second jamb when the foldable barrier is to be moved to the stowed position;

wherein the latch is in mechanical cooperation with one or more of the first jamb strikers when the foldable barrier is in the stowed position, and wherein the latch is in mechanical cooperation with one or more of the second jamb strikers when the foldable barrier is in the expanded position.

15. The device of claim 14, wherein:

the edge beam includes at least one catch, respective ones of the at least one catch interlocks with the one or more second jamb strikers when the foldable barrier is in the expanded position, and respective ones of the at least one catch interlocks with the one or more first jamb strikers when the foldable barrier is in the stowed position.

16. The device of claim 15, wherein:

the lock in mechanical cooperation with the at least one catch, the lock configured to lock and unlock respective ones of the at least one catch with the second jamb strikers when the foldable barrier is in the expanded position, and the lock configured to lock and unlock respective ones of the at least one catch with the first jamb strikers when the foldable barrier is in the stowed position.

17. The device of claim 16, wherein the edge beam further includes a push down handle in mechanical cooperation with the lock.

* * * * *